United States Patent [19]
Leo

[11] Patent Number: 5,814,211
[45] Date of Patent: Sep. 29, 1998

[54] REUSABLE SPIN-ON MULTI SYSTEM OIL FILTER

[76] Inventor: Ano Leo, 229 Sanstone Dr. N.W., Calgary, AB., Canada, T3K 3B9

[21] Appl. No.: 652,355

[22] Filed: May 23, 1996

[51] Int. Cl.$^6$ .......................... B01D 35/06; B01D 35/147
[52] U.S. Cl. .......................... 210/90; 210/132; 210/136; 210/223; 210/232; 210/315; 210/316; 210/338; 210/443; 210/424; 210/456; 210/DIG. 817; 184/6.24; 184/6.25; 123/196 A
[58] Field of Search ..................................... 210/315, 316, 210/132, 136, 223, 338, 416.5, 249, 424, 456, DIG. 17, 90, 232, 443, 444, 499; 123/196 A; 184/6.24, 6.25

[56] References Cited

U.S. PATENT DOCUMENTS

| | | | |
|---|---|---|---|
| 5,078,877 | 1/1992 | Cudaback et al. ...................... | 210/315 |
| 5,569,373 | 10/1996 | Smith et al. ............................ | 210/232 |

FOREIGN PATENT DOCUMENTS

| | | |
|---|---|---|
| 0 287 527A | 10/1988 | European Pat. Off. . |
| 14 61 434 B | 3/1970 | Germany . |
| 19 51 668 A | 4/1971 | Germany . |
| 24 34 075 B | 7/1997 | Germany . |
| 1 333 859 | 11/1968 | United Kingdom . |
| 2 295 331 | 5/1996 | United Kingdom . |

*Primary Examiner*—David A. Reifsnyder
*Attorney, Agent, or Firm*—McFadden Fincham

[57] ABSTRACT

The invention is a spin-on type filter with a reclaimed permanent filter casing and permanent filtering mediums that are washable and reusable. There are three distinct progressive filtering systems that function simultaneously, but separately within one filter housing; one is the full flow filtering at 10 micron capability while the other is in its by-pass fine filtering mode at 1 to 3 micron filtering capability. In addition, a safety full flow filter can be activated to filter the return oil while the main fill flow medium is fouled. Each system can be implemented with multi mediums. The main body of the filter, which comprises the filter head and the mediums, can be separated easily for servicing from its casing which is designed to attach to the engine. Fine stainless steel cloths are being utilized as filtering mediums which can last the life of an engine. Further more, magnetic pieces are utilized to trap suspending metal filings in oil flow. The design of the main filter body as such is that any used conventional filter canister can be simply adopted to it or a new filter canister casing can be utilized whichever is the advantage at the time of installation and of in production.

12 Claims, 23 Drawing Sheets

Fig. 7
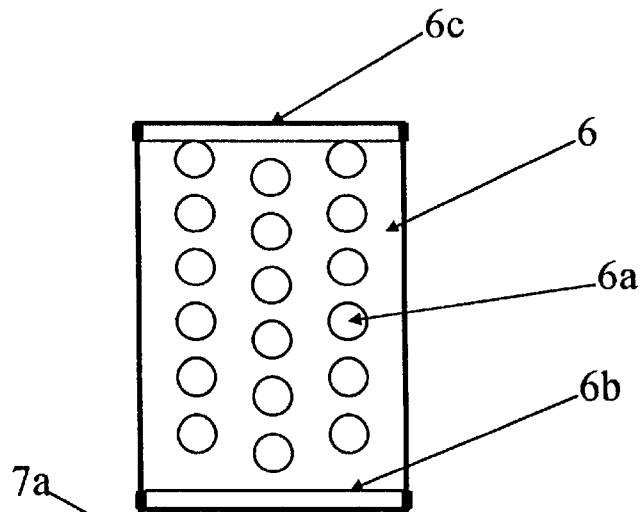
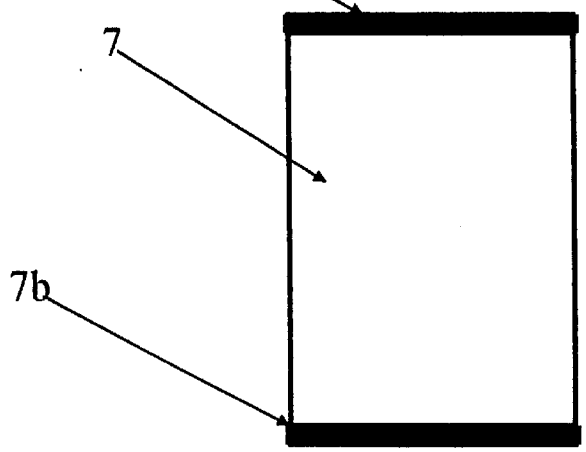
Fig. 8
Fig. 9
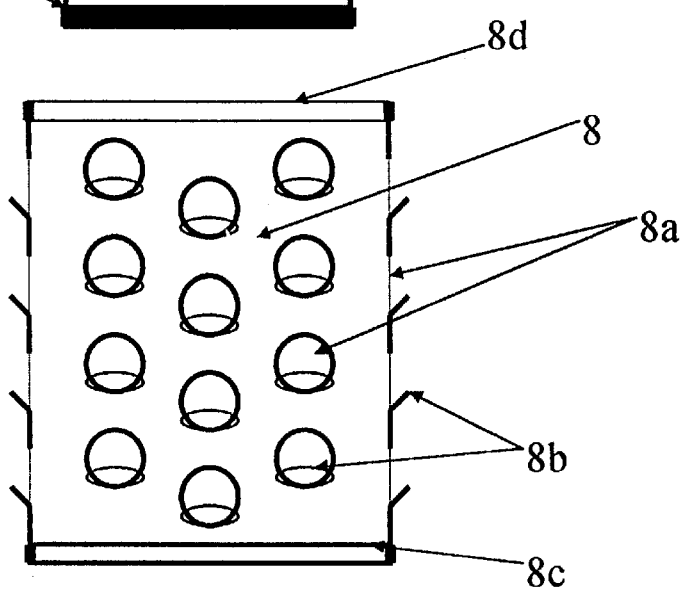

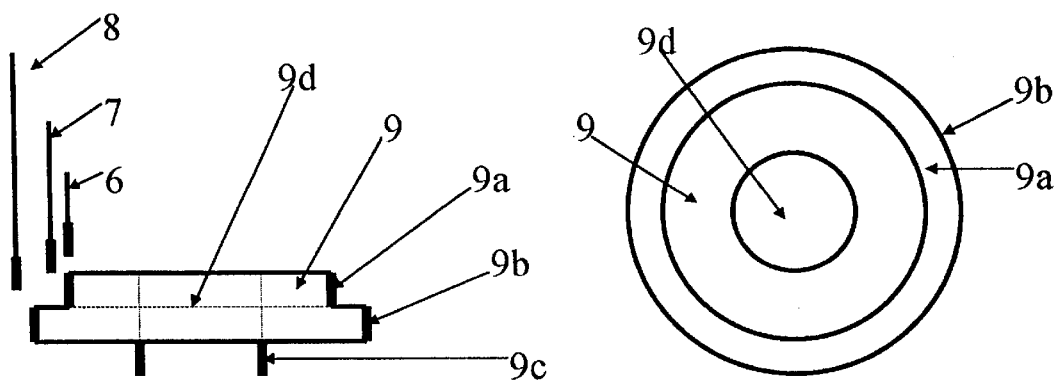
Fig. 10  Fig. 11
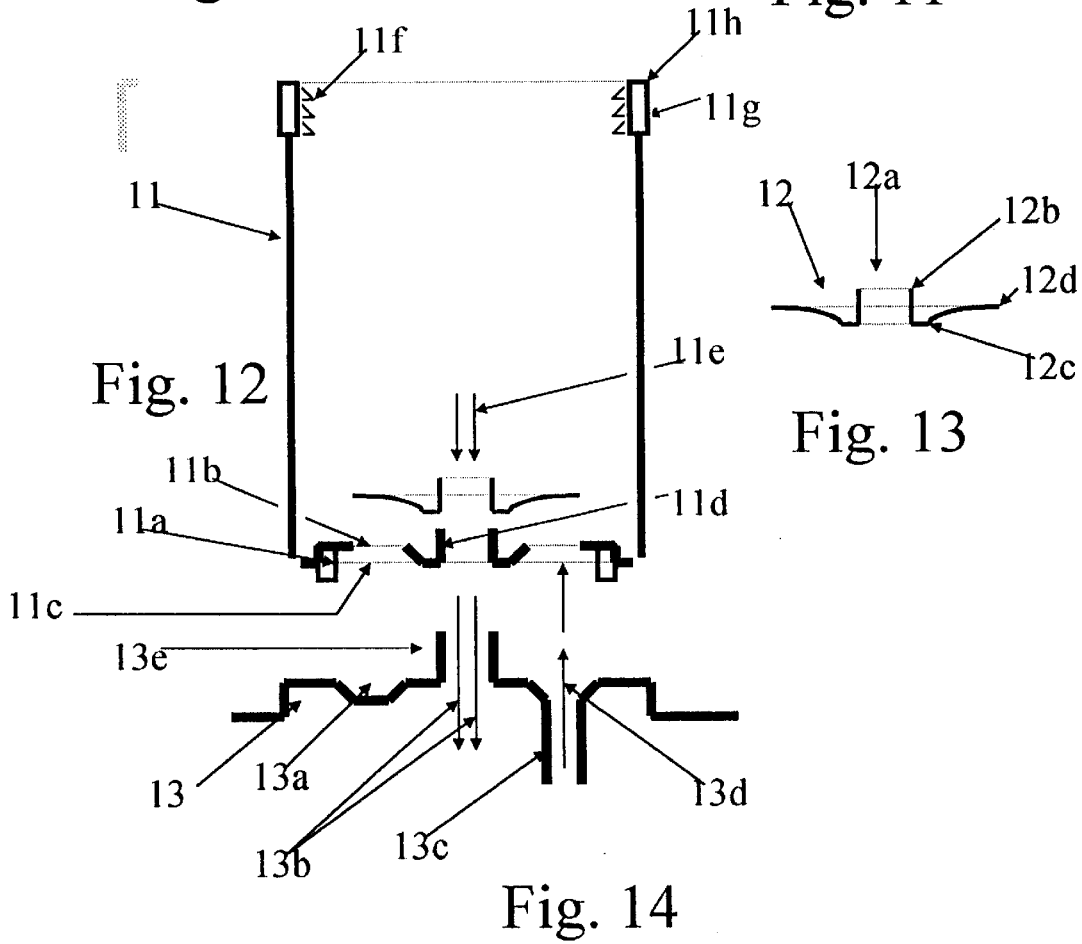
Fig. 12  Fig. 13
Fig. 14

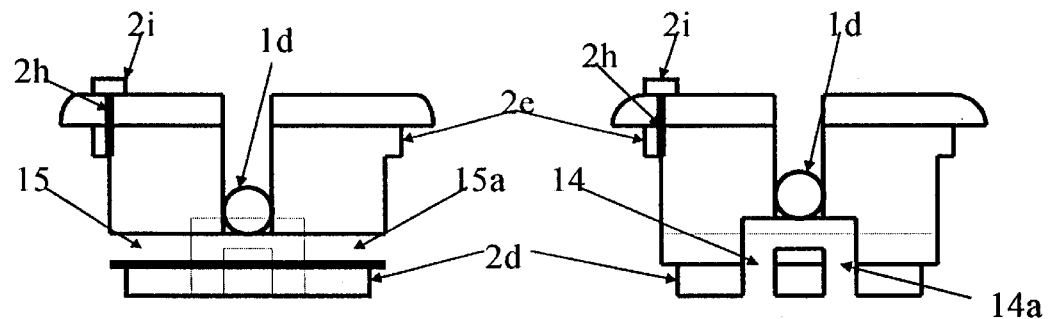
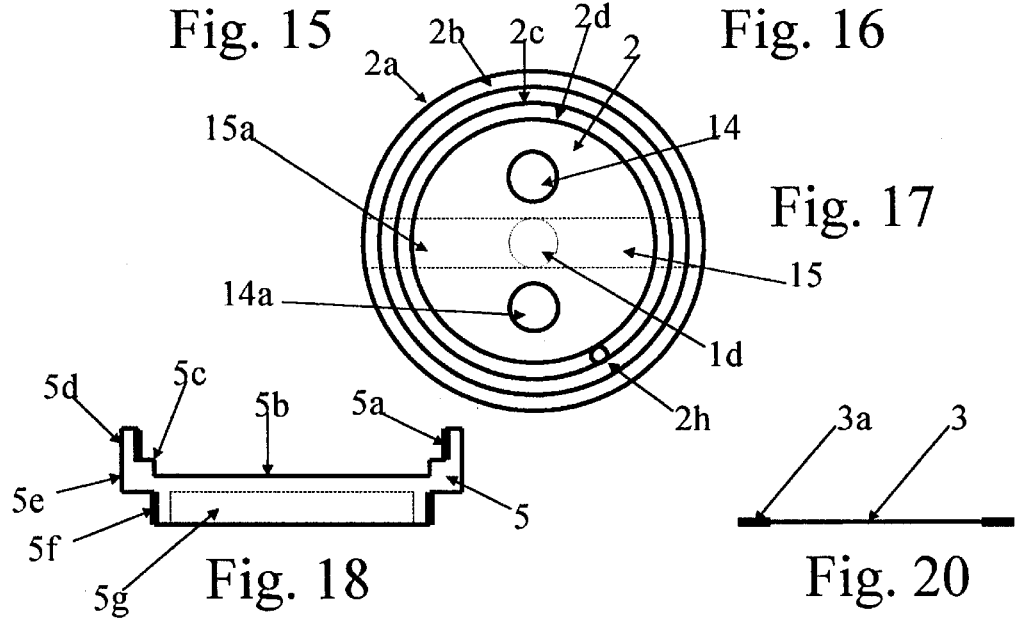
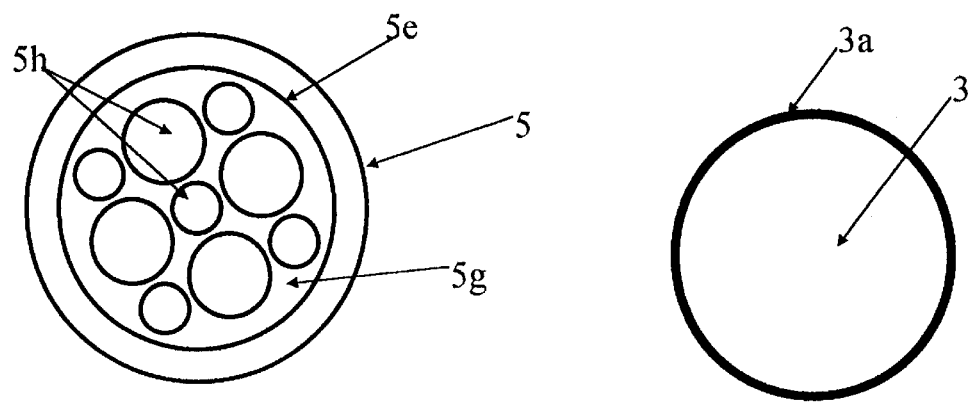

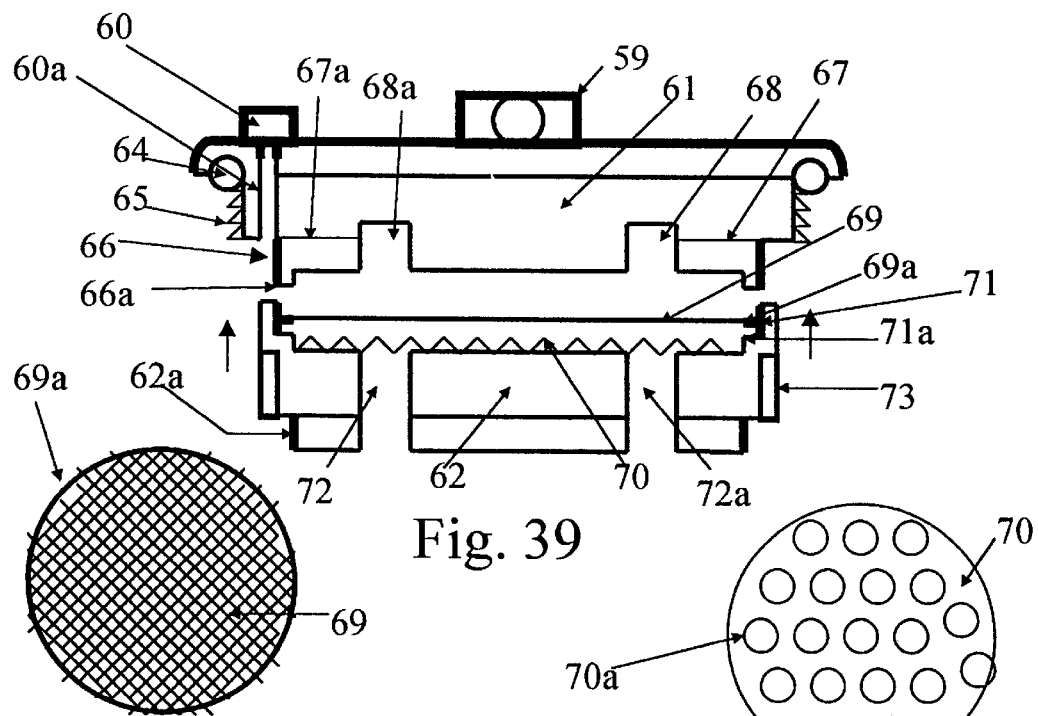
Fig. 39
Fig. 40
Fig. 41
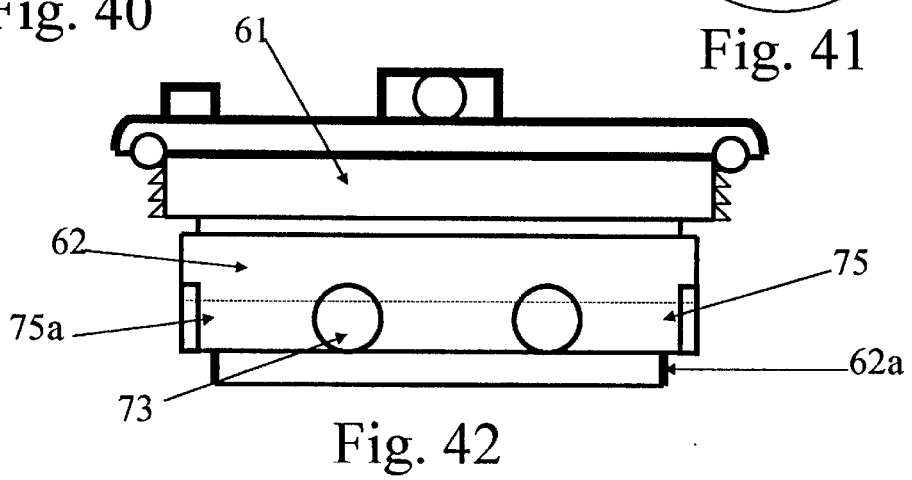
Fig. 42

REUSABLE SPIN-ON MULTI SYSTEM OIL FILTER

FIELD OF THE INVENTION

This invention relates to liquid filters and more particularly to improvements in conventional disposable filters for use mostly in connection with internal combustion engines and the like.

BACKGROUND OF THE INVENTION

Environmental concerns regarding soil and atmospheric contamination, caused by automotive related pollutants, are ever rising and have become important issues for all governments' agenda. Every new passenger vehicle that comes off the production line requires an average of 6 to 8 oil and oil filter changes every year for the next 12 to 14 years which is the average driving life for North American passenger vehicles. Commercial vehicles require 12 or more oil and oil filter changes every year. Older vehicles require even more frequent changes. The disposal of used oil filters and waste oils have been costly and the issues of hazardous environmental problems for all communities continue to grow. The waste generated from filters and discarded oil amounts to billions of units daily the world over. The invention's main object is the elimination of non recyclable oil filters, and the reduction of the frequency of oil changes.

Conventional full flow oil filters on the market are made for disposal after each usage which is a very short period. The filtering efficiency of conventional filters varies from 20 to 120 microns. Conventional oil filters on the market are equipped with a safety valve but some are not. Of those filters, oil starvation to the engine may occur as they are prone to pressure breaks, which opens the paper fibre element and forces the oil to channel through the filter thus eliminating its filtering efficiency. When the conventional filter operates as designed the main oil flow is restricted due to the clogging up of the filter medium. Oil pressure then forces the built-in safety valve to open to allow unfiltered oil to flow back freely to the engine, preventing oil starvation which will lead to serious engine damage. The conventional oil filter's faulty design seriously compromises effective oil filtration because it allows unfiltered oil to flow back to the engine. This detrimental condition is further exaggerated due to the high pressure rapidly moving oil flow resulting from paper filter ruptures washing off particles on the surface of the fully clogged paper medium, carrying said particles on stream back to the engine during the safety mode which is when the safety valve is open as mentioned.

Conventional oil filter canisters are made out of fine steel and the mediums are often made with paper fibre or alike which all go to landfills after their short usage. These materials and the energy used to produce them can be conserved with the implementation of the invention.

Other than the fill flow oil filters, auxiliary by-pass filtering systems for finer micron filtrations are also commonly found on the market. An auxiliary by-pass system works like a kidney cleaning machine, it takes out a little bit of oil at a time, cleans it, then returns the smaller amount of cleaned oil into the engine which merges with the main oil stream. For example: usually ½ of an hour to one hour is one cycle for a full sump tank of 4 liters of motor oil to be cleaned by the bypass system. Some of the full flow filters allow for 16 gallons per minute of oil to be filtered through the engine. The bypass system does not emphasize oil flow but the efficiency in filtering particles in the smallest micron sizes, usually in 1 to 3 micron. Most of the conventional bypass oil filters on the market are bulky units, installed separately from the existing full flow system. They are extremely labour intensive to install and are much more expensive than the full flow filters. These by-pass filters are designed to be disposed of at the time the engines oil is changed.

BRIEF SUMMERY OF THE INVENTION

The invention is comprised of various components; the circular filter head, cylindrical medium supporting member, circular mesh filtering mediums, circular adaptable bushing disk, cylindrical steel cloth filtering medium, cylindrical oil flow guide, retaining base member and the open top permanent filter canister. The above individual components can be fastened together by different means such as; threads, clips, welding, clamps, etc. The filter head is the major part of the invention. There are three distinct filtering systems within the invention, one is the full flow, the second is the built-in bypass system and the third is the safety full flow system including a safety valve. By adding or eliminating particular components each said system can be a single stage filtering system, as well as having the versatility to be extended to multi filtering stages in one system. The terms steel mesh and steel clothe are used interchangeably herein and refer to the same mesh filtering material.

The filter head is circular in shape, preferably a solid piece, it can be made out of materials such as; plastic, cast iron, steel or aluminum depending on its intended applications. For example; for highly corrosive liquids, high quality stainless steel is used. For motor oil filtration, aluminium alloy is adequate for the invention. The versatile design of the filter head allows for its transformation to multifarious functions from simple filtration to multi-stage filtration within multi filtering systems.

The filter head of the invention has added to its basic form a threaded cap as well as having an outer thread at the bottom of the filter head. Within the lower part of the filter head are a set of openings which can be described as tunnel. Said single tunnel is made by drilling a hole horizontally at right angles from one side of the filter head through to the other side. At this stage of the invention the filter head's configuration forms a single functional filter head after having adapted to it a cylindrical shaped full flow filter medium. This basic form can be transformed into a much more complex filter head. The transformation would comprise the addition of multi-sets of various sized tunnels at designated points making oil passages associated with multi-filtering chambers. These chambers and tunnels would be located on different levels within the filter head. The number of tunnels or chambers required depend on the complexity of various filtering requirements. For example; the one solid piece, said single open tunnel filter head is appropriate for one filtering stage of a full flow filtering system which is a very simple application of the invention. A two piece, multi-level, filter could have eight tunnels in the filter head. Some tunnels would be inter-connected with each other and lead to two or more filtering chambers for specific filtering requirements. Oil filtering chambers within the filter head are formed to accommodate circular sheet filtering mediums by providing recess spaces. Bushing like adaptable circular disks containing the medium supporting members and filtering mediums join the parts of the filter together and are sealed by "O" rings. The above system allows for a single filtering system or if the addition of filter medium bearing bushings are added a multi stage filtering is achieved. This system not only allows for the above multiple stage filtering implementations but also allows for the accommodation of additional component parts as required. Various porosity of filtering mediums which are flat circular sheets of tailor cut stainless steel cloth made from course to fine meshes are sandwiched between said recessed bushings. This multi-chamber filter head is a multistage filtering device, is a bypass filtering system and it is one of the three distinct progressive filtering systems of the invention.

The versatility of the invention allows for implementation of either single stage or multiple stage filtering which is solely dependent on the number of filtering mediums and medium bushing disks implemented within said filter head. To extend the function of said filter head, and maximize the filtering effects by utilizing various flow tunnels built-in the filter head, a consolidated 3 piece full flow filtering device all in cylindrical configuration with both circular ends open, can be incorporated at the bottom part of the filter head. At this stage, the filter head itself can be in the single filtering stage or in the multiple filtering stage depending on how many circular medium bearing bushing disks and how many sheet mediums have been installed.

The said 3 piece filtering device in cylindrical configuration is the main full flow system of the invention which consists of, the perforated flow guide on the outside, the courser porosity steel cloth medium in the middle and both slide over and around the core member which is threaded at both ends, corrugated and is a perforated element supporting member which is a rigid member, has one end secured to the bottom threaded retaining rim of the filter head and the other end is secured and enclosed by an outwardly threaded retaining base member. Said retaining base member has a centre hole for return oil flow and when all the above components are assembled a complete filtering core is formed. An integral component of which is made up of the cylindrical main full flow element and the said oil flow guide. The oil flow guide has outward deflecting lips at one side of each perforated hole and the lips are all facing the same direction which is in the direction of the main oil flow. Said flow guide is spaced a minimum of 2 mm away from the outside circumferential surface of said cylindrical main flow filtering element. The purpose and function of said flow guide during the oil flow restricted mode, is to prevent particles that were loaded on the surface of the fully clogged medium, from being washed off by the vibrantly moving main oil flow via the open safety valve tunnel which flows back to the engine. Within the empty core space of the said rigid full flow medium supporting member, a smaller cylindrical device resembling this member but comprised of a finer medium and its support member can be installed in addition to the said full flow medium, not shown in Figure. These additional members form a progressive multi stage full flow filtering system when incorporated in the staged filtering system. This additional stage can increase the holding capacity of the filter and enhance its efficiency due to the entrapping of smaller contaminants because of the increased range of filtering mediums sizes utilized.

To further extend the adaptability and versatility of the invention, one of the aforementioned circular medium bearing disks having the appropriate circular flat steel-cloth medium, can be installed by the same threaded means as the bottom retaining rim of said filter head. This is the safety full flow filtering system located at the exit of the safety valve tunnel installed after the safety valve. This version of the invention is equipped with a three-in-one pressure activated device; safety valve, sensor and dash board light indicator. When said cylindrical main full flow filtering medium is clogged up causing oil flow restriction the sensor light comes on indicating the safety valve is open whereby main oil flow enters the safety tunnel and is filtered by the said safety full flow filter. This safety full flow filtering measure, after the safety valve of the invention is a safety feature that the conventional oil filters presently do not have provided. The invention can utilize various types of existing sensors and safety valves depending on different applications desired.

The invention, in addition to the above mentioned functions, has strong magnetic pieces imbedded and spaced in each filter head, radially, on its periphery and in strategic locations. The space within the filter canister, and around the filter head is a circular channel or reservoir where magnetic implants imbedded in the lower part of the filter head are exposed to the main flow of oil but away from the rapid current. Said magnetic pieces attract metal pieces within their field which are moving within the oil flow thus removing them from the engines moving parts. The tiny metal filings and scrap pieces trapped by the strong magnetic pieces would be able to avoid entrapment when in the strong oil current. The small metal pieces would be carried away if the magnetic implants were installed further up stream of the main oil flow. Because the filtering body can be easily dismantled by unthreading the component parts cleaning of the magnetic implants makes them highly effective.

The invention while incorporating two distinct filtering mechanisms are housed in a generic filter canister. The basic filter head incorporates a single cylindrical full flow element and safety valve. The complex filter head incorporates a multi tunnel, multi chamber for multi stage filtering and in addition to that having a safety full flow filter, a cylindrical full flow filtering device and magnetic pieces forming four distinct and separate filtering systems housed within one filter canister.

The invention, as described, is versatile, interchangeable, adaptable and has multi functions for different applications. The invention comprises a single stage to multi stage bypass filtering system as well as a safety filtering system within the filter head. The invention utilizes a range of 1 to 35 micron circular sheet steel cloth elements. The cylindrical full flow element also has various ranges of micron sizes that can be used depending upon specific requirements.

The versatility of said filter head of the invention, enables alternate filtering configurations to be employed. When installing space for the filter on a given engine is of prime importance the invention filter body configuration can be changed by the safety valve being incorporated at the bottom centre of the filter head thus yielding space and enabling a shorter filter head to be made. This filter head of the invention comprises nearly all functions as the aforementioned but without the sensor and the indicating light and the safety full flow filter system.

Within the multi-chamber filter head, a set of two or four tiny holes, about "300" microns in diameter, depending on the size of the filter and flow requirement, will be drilled through from the outer circumference of said filter head into the upper part of the bypass filtering chamber. These tiny holes are the inlet-port orifices for controlled amount of small oil streams that enter the upper filtering chamber to be filtered. A further versatile transformation of said filter head, is made by enlarging the diameter of the small stream in-port orifices which lead to said upper filter chamber. Then converting them to become main oil flow tunnels for oil passage and replacing the very fine filtering mediums to an appropriate courser porosity. Oil flow is thereby increased, then the said bypass system is easily transformed into a full flow filtering system from its original configuration.

Within the circular filter head, beneath the multi-chamber or the single chamber, three sets of oil flow tunnels are located on different levels. The first set of two vertical tunnels is part of the bypass system and is for the oil to permeate through and the filtered oil to merge with the main filtered return oil stream which comes through the cylindrical full flow medium. The second set of two tunnels is usually closed by the safety valve, except when the unfiltered main oil stream is restricted then the oil pressure forces the safety valve to open up allowing said main oil stream to flow back to the engine preventing starvation of oil to the engine. The third set of tunnels runs straight across from side to side in the lowest level of the filter head allowing oil flowing freely to reach the safety valve at any time in case the main full flow filtering medium is totally or partially fouled and oil flow is restricted. The forth is a small single tunnel running vertically down from a point near the rim at the top of said filter head. This small tunnel becomes the drain conduit for draining oil from the invention before an oil and filter servicing. Said drain conduit is also for the convenience of collecting oil samples for analytical purposes. At the bottom part of said filter head one end of said cylindrical medium supporting member and said cylindrical full flow medium are mounted. All return oil will flow within the said supporting member. At the other end of the said cylindrical medium supporting member, a retaining base member with a centre hole is mounted to secure said cylindrical medium supporting member and separate the oil path. The above, when fastened as a whole can be inserted into a cylindrical shape, open ended filter canister. Said filter head can be secured to the canister by threaded means, the thread is located in the interior of the rim of the open ended canister and is sealed by an O-ring when screwed down preventing oil leakage.

Said filter head and the embodiment of the invention are able to utilize the conventional throw-away filter canister. The invention is able to adopt the convenience of the existing conventional method for installing an oil filter on an engine by the spinning on method. Part of the invention utilizes the conventional filter by machining off the filter top of the used canister and removing the used paper filter medium. Then the core of the invention is installed in the used filter canister by installing a U-shaped inner threaded metal ring right on and around the cut-off rim which re-inforces the used filter canister and makes it rigid. The next operation covers the insertion of the invention's entire filter body into the said used filter canister. This insertion is threaded into the used filter canister by the outer threaded filter head being turned into the inner threaded metal ring. The embodiment of the invention is the utilization of the used filter canister adapted as described and or the production of a new filter canister which can be manufactured, either of which when utilized with the internal workings (core) previously described forms the entire invention. The servicing of the invention becomes obvious one version of the invention the indicator light is illuminated when servicing the invention becomes necessary. There are several configurations of the invention that have indicator light assemblies incorporated in their design and some others have not. With respect to the versions of the invention that have indicator lights the filter is serviced by unscrewing the top cap of said filter head and the whole filter body can be removed from the cylindrical filter canister. Said main full flow medium is then fully exposed for easy cleaning. The by-pass medium within can also be serviced at the same time and can be removed for servicing by undoing the top portion of the filter head. For versions equipped without a sensor and indicator light simply service the filter according to the manufacturer's recommended schedule; usually at three to six thousand kilometer intervals, or by the result of an oil sample analysis.

In the normal filtering mode, the oil flows into the invention via the one way valves from the engine, filling up the space inside the housing around the filter head and the body. The main stream of oil flows rapidly through the main full flow filtering element. It returns to the engine while the small orifices are receiving small streams of oil. The small stream of oil by sheer pressure forces its way into the by-pass chamber. The filtered oil then passes through the one to three micron steel cloth mediums. The finely oil which is in small quantities then runs down the two tunnels and merges with the courser filtered main oil stream within the cylindrical element supporting member and the oil then continues its flow path back to the engine.

In the restricted filtering mode, the main oil flow is restricted from the particle loaded filter medium. Then via the open tunnel, oil pressure forces the safety valve to open allowing the main oil stream to flow through the two tunnels at different levels. At this stage the main oil stream returns to the engine without being filtered unless said safety full flow element is installed. There may be a small amount of oil permeating through the by-pass system depending upon the condition of the by-pass medium at this stage. Even though the bypass chamber, or chambers are prematurely clogged with particles, it does not affect the unfiltered main oil stream flow through the full flow element when it is in normal mode. Nor when the main oil stream is in the restricted mode, because the restricted mode has a separate set of safety tunnels and or a separated safety full flow filter for its own oil passage.

OBJECTS OF THE INVENTION

The object of the invention is designed to reduce environmental waste by reclaiming the gigantic numbers of discarded conventional oil filter canisters and by reducing the frequency of oil changes. Reducing the contamination of dump sites by eliminating the disposal of those large numbers of paper filtering mediums and greatly reducing the amount of used oil through more efficient filtration. The invention also offers a filtering device with adaptability, versatility, efficiency and is economical thereby providing a better alternative to conventional oil filters. The invention is a highly efficient filtration system suited for both heavy industrial usages and retail automotive trade.

BRIEF DESCRIPTION OF THE DRAWINGS

Having thus generally described the nature of the invention, reference will now be to the accompanying drawings, showing by way of illustration a preferred embodiment thereof, and in which:

FIG. 7 shows the side view of the cylindrical corrugated, perforated medium supporting member.

FIG. 8 shows the side view of the cylindrical steel cloth full flow filtering medium.

FIG. 9 shows the side view of the cylindrical perforated, oil flow guide with deflected lips.

FIG. 10 shows the cross sectional view of the circular retaining base-member and the coordinated positions of the cylindrical medium supporting member, the cylindrical full flow medium and the cylindrical flow guide.

FIG. 11 shows the top view of the retaining base-member.

FIG. 12 shows the cross sectional view of the open ended conventional filter canister.

FIG. 13 shows the cross sectional view of the dual function circular seal gasket and the back flow flap cover.

FIG. 14 shows the cross sectional view of simulated oil filter mounting base on an engine.

FIG. 15 shows another cross sectional view of the one piece filter head illustrates the safety valve in its open position and the two safety flow tunnels.

FIG. 16 shows another cross sectional view of the one piece filter head illustrates the open flow tunnel at the lower part of the filter head and the closed position of the safety valve.

FIG. 17 shows the bottom view of the filter head illustrates the coordinated positions of the two safety valve flow-tunnels-exits in FIG. 15, the open flow tunnel in FIG. 16 and the safety valve chamber in FIG. 15 and 16.

FIG. 18 shows another cross sectional view of the circular adaptable bushing disk in FIG. 6.

FIG. 19 shows the top view of said circular adaptable bushing disk.

FIG. 20 shows the cross sectional view of the circular steel cloth sheet medium with no centre opening comprising a U-ring sealing gasket mounted on its outer edge.

FIG. 21 shows the top view of said circular steel cloth sheet medium referred to in FIG. 20.

FIG. 39 shows the cross sectional view of the transformed two piece filter head comprises with a single stage bypass system.

FIG. 40 shows the top view of said first circular bypass sheet medium without the centre opening referred to in FIG. 21.

FIG. 41 shows the top view of said first circular perforated and corrugated underlay member referred to FIG. 5.

FIG. 42 shows the cross sectional view of said two piece filter head enclosed with a single stage bypass system.

DESCRIPTION OF THE PREFERRED EMBODIMENT

Figure 1:
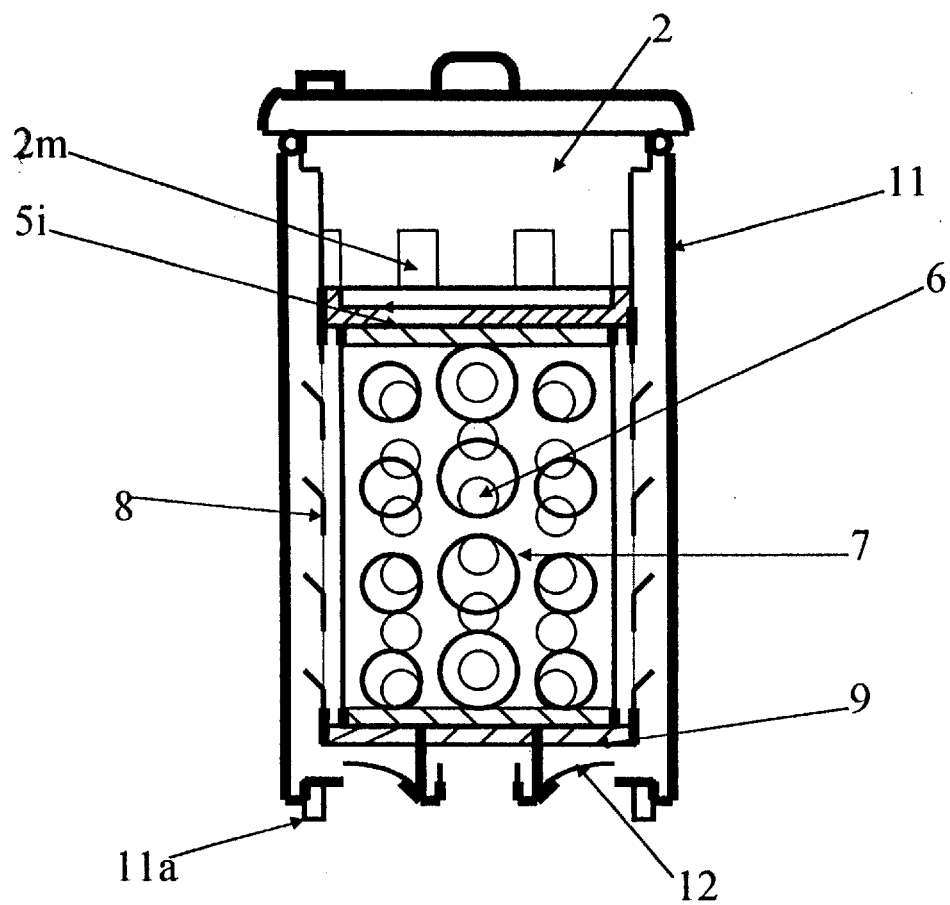
FIG. 1 shows a schematic view of an assembled invention.

FIG. 1 the filter head 2 is a circular solid piece of metal with magnets 2m imbedded radially in its outer circumferential surface. The safety full flow filter 5i is a series of threaded components forming the filter body. The internal parts in sequence are: A. cylindrical full flow medium supporting member 6. B. cylindrical full flow medium. C. cylindrical full flow oil guide 8. D. Retaining base member 9. And E. The cylindrical filter canister 11 which can be adapted from a used conventional oil filter. The member at the bottom is the circular sealing gasket 11a of said filter canister. The internal gasket member 12 with circular flap flared out axially also functions as a back flow cover to prevent dirty oil flowing back to the engine.

Figure 2:
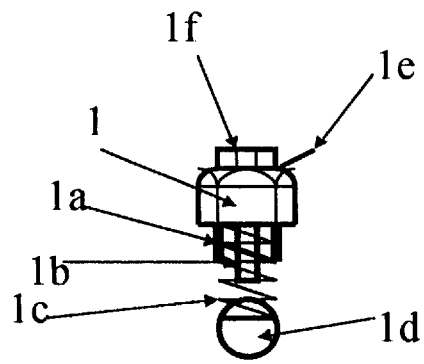
FIG. 2 shows schematic view of the safety valve device.

FIG. 2 shows a conventional device adapted to enhance the function of the invention, the spring 1c holds the ball 1d in closed position, when pressure pushes the ball 1d up and touches the hollow pin 1b triggering the ground contact of the DC circuit connected by 1e which is held in place by a small nut 1f which completes the circuit and turns the warning light on. Thread 1a is provided adjacent and beneath the main nut 1 for fastening within the said filter head.

Figure 3:
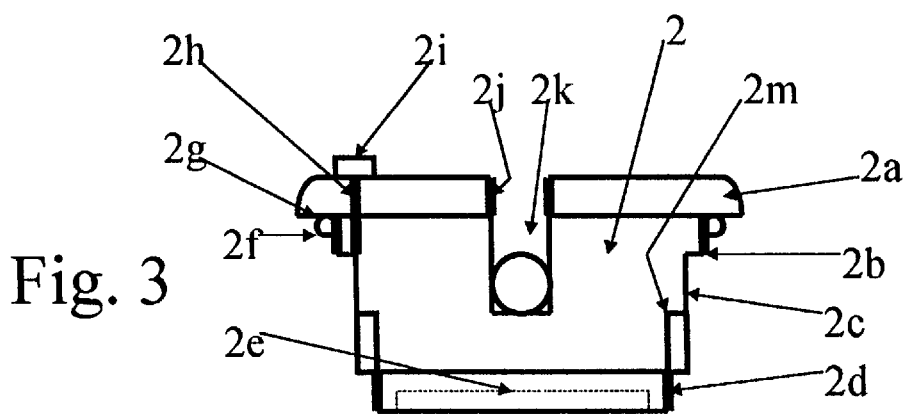
FIG. 3 shows the cross sectional view of the one solid piece filter head and the central chamber of the safety valve device and the position of the drain conduit.

FIG. 3 illustrates the said filter head 2, its apparent structure is configured of four circular portions which gradually decease in circumferential sizes from the top to the bottom. The top portion 2a is configured as a cap having a radially overhanging flange which is beneath and adjacent to the portion 2b which has a threaded outer circumference. On the threaded outer circumference a O-ring sealing gasket 2f rests snugly in a circular groove 2g beneath the said flange 2a. One level lower is the larger body portion 2c whereon imbedded magnetic pieces 2m are implanted. The adjacent bottom projected rim 2d is threaded on its outer surface which may be adaptable by either an inward threaded circular bushing disk 5 in FIG. 6 or with a cylindrical medium support member 6 in FIG. 7. A circular recessed indentation 2e is at the bottom face of said rim 2d wherein forms the upper filter chamber when connected with aforementioned circular bushing disk 5, referred to in FIG. 6. The threaded drain nut 2i plugs the drain 2h which is shown more clearly hereinafter in FIG. 22. The centre chamber cavity 2k wherein said device 1 in FIG. 2 is held in position by a thread 2b which matches thread 1a on nut 1 in FIG. 2. Said chamber 2k is also designed for alternate applications where a pressure sensing gauge may be utilized.

Figure 4:
FIG. 4 shows the cross sectional view of the safety full flow circular sheet medium.

FIG. 4 illustrates a cross sectional view of a circular sheet filtering medium 3 having a U-ring sealing gasket 3a mounted around its perimeter. Said medium 3 will be labelled as first circular sheet medium 3 in order to distinct the other circular sheet medium with a central opening which will be labelled as the second circular sheet medium 32 hereinafter.

Figure 5:
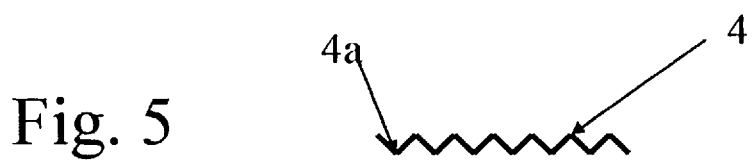
FIG. 5 shows the cross sectional view of the corrugated and perforated underlay member of the safety full flow circular sheet medium.

FIG. 5 illustrates a cross sectional view of a circular medium underlay member 4 which is corrugated and perforated. On said underlay member's top surface is where said first circular sheet medium 3 is laid. Said underlay member will be labelled as first circular medium underlay member 4 in order to distinct the other circular medium underlay member with a central opening which will be labelled as the second circular medium underlay member 4 hereinafter.

Figure 6:
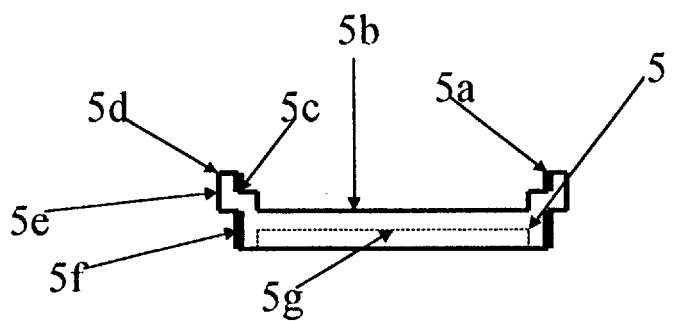
FIG. 6 shows the cross sectional view of the circular bushing disk which is the supporting retainer for the circular sheet medium and the circular medium underlay member forming the safety flow full filter.

FIG. 6 shows a cross sectional view of an adaptable circular bushing member 5, which has a circular indentation forming a recessed surface 5b configured to receive said first medium 3 and said first medium underlay member 4. Said circular recess surface 5b is encompassed by an axially extending raised ledge 5c. The thickness of said member 4 in FIG. 5 when is laid on 5b does not exceed the height of said ledge 5c which is designed to hold the said U-ring sealing gasket 3a of medium 3 when it is rests on top of the said first underlay member 4. An inner thread 5a is adaptable to receive other thread means 2d in FIG. 3 is implemented adjacent above said ledge 5c. A circular projected rim 5d is a result of the above indented configuration. When said first medium 3, first underlay 4 and bushing 5 being assembled together which constituted a safety full flow filter assembly which can be attached to the threaded bottom portion 2d of said filter head 2 in FIG. 3. The smaller outer bottom portion 5f has a threaded circumferential area designed to receive a cylindrical medium support member 6 in FIG. 7. Said circular adaptable bushing disk 5 will be described further in detail concerning its other functions hereinafter in FIG. 18, 20, and 48. Said circular bushing disk 5 will be labelled as first circular bushing disk 5 hereinafter in order to distinct the other circular bushing disk with a central projected rim bordering a central opening which will be labelled as the second circular bushing disk 42, referred to in FIG. 36.

FIG. 7 depicts a cross sectional view of a circular, cylindrical, corrugated, perforated metal medium support member 6 having both ends 6b and 6c threaded. Inner threaded end member 6c connects with thread 5f of said first circular bushing disk 5 in FIG. 6. Perforated openings 6a are passages for oil that penetrates through to the core space from the cylindrical filtering medium. Other inner threaded end 6b is adapted with another component; a retaining base member 9 in FIG. 10.

FIG. 8 shows the circular cylindrical steel cloth filter medium 7 having both circular ends mounted with a circular "U" shape O-ring 7a and 7b. Said cylindrical filtering medium 7 is sheathed over said cylindrical medium supporting member 6 in FIG. 7.

FIG. 9 shows that the circular cylindrical metal flow guide 8 has rows of large perforated holes 8a and a pretruding lip 8b on one side of each hole, said lips are designed to deflect the flow of oil along the filter wall towards the safety valve. The upper circular end 8d of the flow guide 8 slides over said cylindrical filtering medium 7, said circular end 8d has no threads but tightly fits around the non threaded portion 5f of said first circular bushing member 5 in FIG. 6 and is ready to be fastened in position at a later sequence. The lower circular end 8c is threaded together with the end member 9b of a retaining base member 9 in FIG. 10.

FIG. 10 shows said retaining base member 9 which is a two tier threaded adapter forming the base of the filter core body. Said base member 9 has a outward thread on the smaller circular platform portion 9a thereto for connecting with threaded said end member 6b of cylindrical medium supporting member 6 in FIG. 7. Its larger bottom portion has a radially extending flange area whereon said end member 7b of said cylindrical filtering medium 7 in FIG. 8 rests against. The other adjacent thread 9b on the circumferential surface of said bottom portion is to be connected with the lower threaded end 8c of said flow guide 8 in FIG. 9. At the bottom face of said retaining base member 9 a smaller cylindrical collar-like supporting member 9c is welded, preferably threaded in its centre allowing the return oil to flow through the centre hole 9d. The aforementioned filter assembly can now be connected to the said retaining base member 9 in appropriate series. Said oil flow guide 8 in FIG. 9 slides down and is joined together at thread 8c with matching thread 9b in FIG. 10. The above assembled parts thereby form the completed lower-part of the filter body. This assembled filter head with filtering body is inserted into the open end of said canister 11 in FIG. 12.

FIG. 11 is the top view of said retaining base member 9 of FIG. 10 showing appropriate positions and features.

FIG. 12 illustrates a cross sectional view of a conventional disposable filter's steel canister having its top portion machined off. A metal circular U-shape O-ring 11g with the open end downward having its inner axial surface 11f threaded, is mounted on the top edge of rim 11h of the said canister 11. The smooth roundish top-side of the metal U-ring 11g is ideal to make a tight seal when securely threaded against the rubber O-ring sealing gasket 2g in FIG. 3. At the bottom of the canister 11, the rubber O-ring sealant 11a is the vital sealing gasket which is grooved in around the bottom part of the conventional filter canister to prevent leakage. A circular heavy gauge steel plate is the main structural base of the filter canister. The circular steel plate is configured with a radially concave area 11c on which a plurality of holes are symmetrically perforated and located in a circular pattern. The function of the holes are to act as inlet ports 11b for oil to enter the canister. The radial concave area is shown more clearly and is referenced in FIG. 22 and hereinafter. On the said circular steel plate a larger centre hole 11d is also perforated and is threaded on its inner surface. Said centre hole 11d is the only main outlet port of the invention for return oil which is shown on path 11e flowing back to the engine block.

FIG. 13 shows a dual function circular plastic member which is moulded in one piece comprises a cylindrical collar 12b and a circular flap 12d flared outward thereby forming a circular groove 12c in between the said 12b and 12d. Said collar 12b contains an opening 12a which is designed to receive and sheath around 11d in FIG. 12. Said assembled filter embodiment when inserted into said filter canister therein said cylindrical collar supporting member 9c of said retaining base member 9 in FIG. 10 rests and fits on the circular groove 12c thereto, when said collar-flap member 12 is held down firmly in place by the complete filter insertion and when threaded together in the conventional fastening motion, it then becomes an internal sealant between the embodied filter assembly and the bottom assembly of the filter canister therein separating the incoming and outgoing oil flow. Said circular flap 12d covers said radially positioned inlet ports 11b to prevent oil flow back to the engine block when the engine is not in operation. Said assembled filter head and said canister when completed forms the invention. The invention is mounted on the engine block by the centre threaded female receiving member 11d in FIG. 12 which is placed on top of the male threaded member 13e and threaded together by a spin on method on the oil filter mounting in FIG. 14. The spin on rotation is continued until the O-ring seal gasket 11a is in intimate contact with the engine mounting base and has been tightened one and a half further turns so that the invention is secured tightly in position.

FIG. 14 shows the conventional oil filter mounting base 13 illustrating the exact position of convergence with the filter canister. When the invention is firmly attached onto the mounting base 13 in FIG. 14, a circular oil tunnel 17 reference to FIG. 22 and hereinafter, is formed by closing a recessed circular indented area 13a matching with said circular concave area 11c in FIG. 12. Oil on path 13d comes through outlet port 13c and is distributed evenly within the said circular tunnel 17 before entering said inlet ports 11b leading into the canister of the invention. Return oil flow at 11e and 13b coincides with the return oil flow in FIG. 14.

FIG. 15 shows another cross sectional view of said one piece filter head referred to FIG. 3 illustrates the positions of the open oil flow tunnel exits 15 and 15a and the appropriate position of drain conduit 2h. When the cylindrical main full flow medium is functioning normally, oil flows freely in and out of the said open oil flow tunnel without disturbing the safety valve 1d. Broken lines shows the coordinate position of the safety valve tunnels referred to in FIG. 16.

FIG. 16 shows another cross sectional view of said one piece filter head referred to in FIGS. 3 and 15 illustrates the positions of the safety valve tunnels 14 and 14a and the appropriate position of drain conduit 2h. When the said cylindrical full flow medium is restricted then oil flow is thereby forced to move upward and pushes up the safety valve 1d in the open position allowing oil to enter the safety valve tunnels 14 and 14a. Broken line shows the position of the open flow tunnel referred to in FIG. 15.

FIG. 17 is the bottom view of said one piece filter head 2 referred to in FIGS. 3, 15 and 16, illustrating the coordinate positions of the safety valve tunnel exits 14 and 14a, open tunnel exits 15 and 15a, the central position of the safety valve 1d and the position of the drain conduit 2h.

Figure 48:
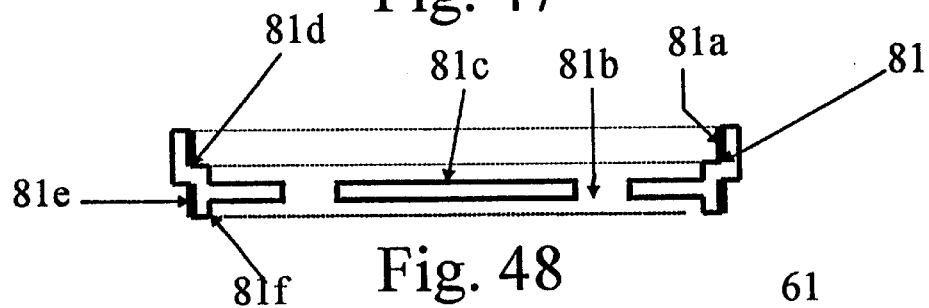
FIG. 48 shows the dual medium and underlay retainer member, the first circular bushing disk which is the same circular bushing disk shown in FIGS. 6 and 18, for nesting the safety full flow medium and the medium underlay member.

FIG. 18 illustrates more clearly said first circular bushing disk 5 which is the same circular bushing disk 5 also referred to in FIGS. 6 and 48. Said first circular bushing disk 5 has four additional functions the first of which is 5b, having an indentation recess to contain said first medium and said first underlay shown in FIGS. 20 and 21. The second of which is 5a, a female thread designed to receive the threaded bottom retainer rim 2d shown in FIGS. 15 and 16. The third is 5f which is the male threaded portion of the bottom retainer rim. The alternate function of 5f is to receive the cylindrical medium supporting member 6 in FIG. 7. The fourth of which is 5g, the bottom indentation designed to receive said first circular sheet medium 3 which becomes an upper chamber of the dual bypass system. FIG. 18 in relationship to FIG. 19 can be utilized as an adaptable bushing member to attach several filtering mediums in tandem making a series of filtering components.

FIG. 19 shows the bottom view of said first circular bushing disk 5 with perforated holes 5h and also shown in FIGS. 6 and 48.

FIG. 20 shows the cross sectional view of said first circular sheet medium 3 which is mounted with a U-ring sealing gasket 3a, referred to FIG. 4.

FIG. 21 shows the top view of said first circular sheet medium 3 and the U-ring 3a. Said medium 3 without a centre opening is used in said safety full flow filter 5i as well as for mediums that are used for single and dual bypass filtering systems, as well as for alternate construction of the invention and for purpose to be mentioned hereinafter, referred to in FIG. 40.

Figure 22:
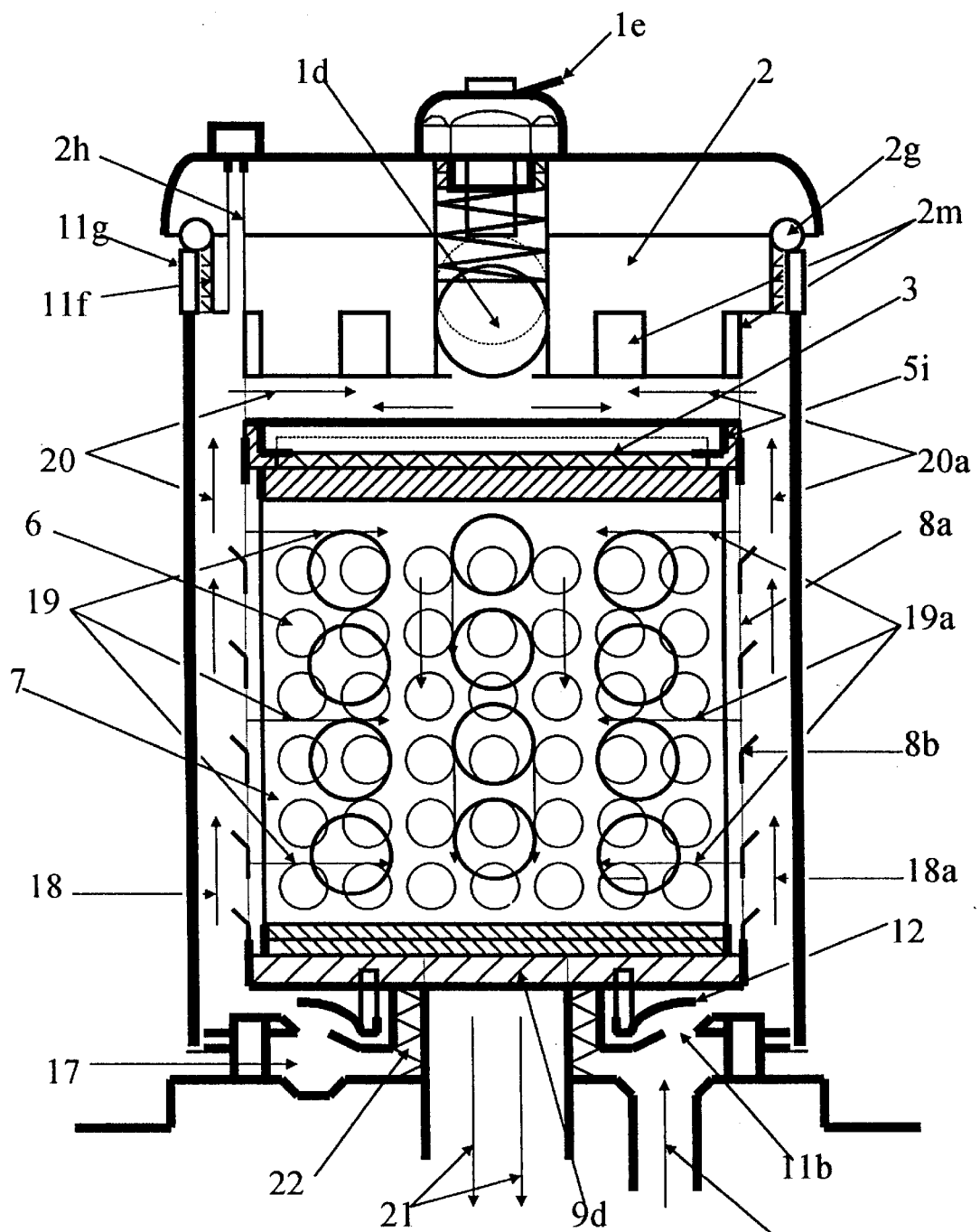
FIG. 22 shows the cross sectional view of the one piece assembled functioning invention in its normal full flow filtering mode, without the bypass system in the filter head, showing the oil path with safety valve closed and having a safety full flow filter.

FIG. 22 depicts a cross sectional view and defines more clearly the invention. Said one piece filter head 2 is the configuration without the built-in bypass system but it is equipped with said safety valve device 1d and 1e and said safety full flow filter 5i which is comprises with said first circular bushing disk 5 when added to medium and underlay, referred to in FIGS. 6, 18 and 48. When in the proceeding, this assembly the invention, is in the normal filtering mode. Oil path 16 shows the oil moving from the engine and rapidly flowing around the oil tunnel 17. Oil then enters said inlet ports 11b, forces open the back flow flap 12 and circumfuses paths 18 and 18a. It continues passing through perforated holes on said flow guide 8 then permeates said cylindrical full flow medium 7 and its perforated cylindrical supporting member 6. The oil continues to flow through paths 19 and 19a within the hollow core space of said support 6, gathering momentum and passing through the centre opening 9d of said circular retaining base member 9, carrying on through path 21 then returning to the engine. Oil flow to paths 20 and 20a demonstrates that some oil moves around within the designated space of the invention and travels in and out of said open flow tunnel above the said safety full flow filter 5i. Said magnets 2m attract any iron and steel metal particles that pass by. Said safety valve 1d is a stand-by in the normal filtering mode position. The invention has two important thread means on the main filter body for descriptive purpose. The first is located on the filter cap and designated as 2b. This thread secures the filter cap with the filter canister at inward thread 11f on U ring 11g. To form a seal of the above two threaded components a "O" ring 2g is utilized. These joining devices integrated together form a major fastening mechanism to the invention. The drain conduit 2h is located at a very strategic position having an extremity adjacent to thread 11f, in most cases particularly for large trucks the drain in this position is designed for the convenience in servicing. The vertical inverted position of the invention will drain out 95% of the residual oil in the filter canister during servicing. At the bottom portion point 22 is the thread that secures the filter canister in place with the oil filter mounting base of the engine.

Figure 23:
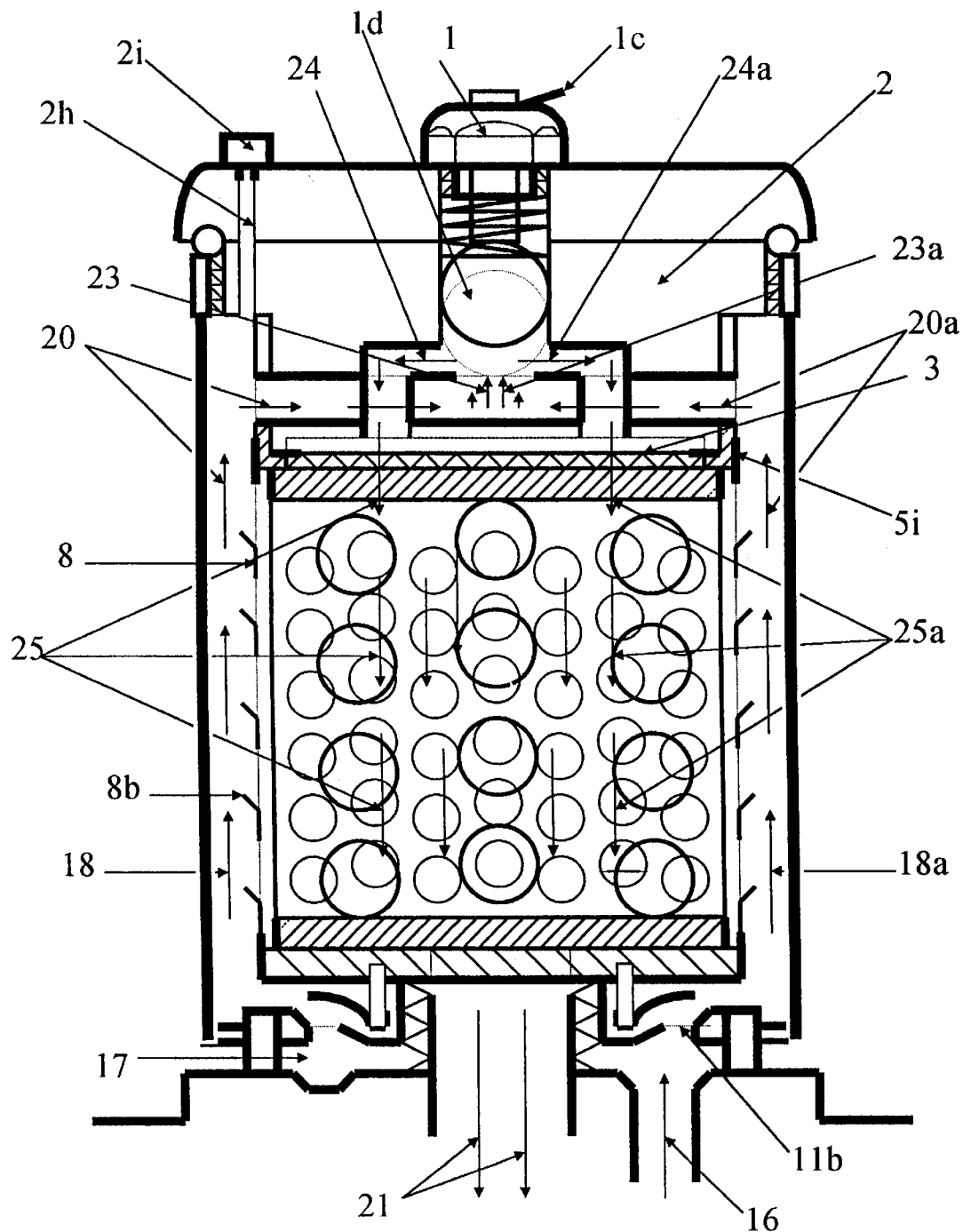
FIG. 23 shows the cross sectional view of the one piece assembled functioning invention in its restricted filtering mode, reffered to in FIG. 22, illustrates the oil path, travels with safety valve open through the safety valve tunnels and the safety full flow filter installed.

FIG. 23 depicts the invention without the bypass system in accordance with FIG. 22 but is still a functional full flow filtering system comprises of said safety full flow filtering system 5i including said safety valve 1 in a restricted filtering mode. Both systems are housed within a reclaimed conventional filter canister. Oil flowing on path 16 travels around space 17 and forces open the circular flap 12, entering inlet ports 11b. Defused oil flows around said cylindrical full flow medium 7 and forward on paths 18 and 18a. When said cylindrical full flow medium 7 surface is fouled with particles the space around said medium 7 is maintained by having said flow guide 8 in between separating the vibrantly moving oil flow from the clogged filtering medium. There is little or no movement within the said space thus the oil flow is relatively stagnate compared to the oil flow on the outside of said flow guide 8. The oil current moves rapidly towards the safety tunnels deflected further by said protruding lips 8b. The oil flows along without disturbing the neutral space behind the said flow guide 8 because of the baffling action of the protruding lips 8b. The flow guide's function is to prevent the vibrantly moving oil stream from washing off the particles that were trapped on the surface of said medium and being carried back to the engine. Oil flowing along paths 20 and 20a inside the open flow tunnel proceeds on upwardly to paths 23 and 23a and pushes said safety valve 1d to open. The oil flow proceeds on paths 24 and 24a then downward to paths 25 and 25a entering the chamber of said safety full flow filter 5i and filtered by said first circular sheet medium 3. The oil then permeates into the core area within the main cylindrical full flow medium 7 gathering momentum for the return to the engine shown on path 21. Said safety valve 1d is lifted to contact the sensor pin 1b activating the indicator light connected to 1c alerting the operator that safety valve is open and the main full flow medium is fouled. As the oil flows around the filter head said magnetic pieces 2m imbedded in the lower filter body trap and thus remove suspended iron and steel particles from the oil flow.

Figure 24:
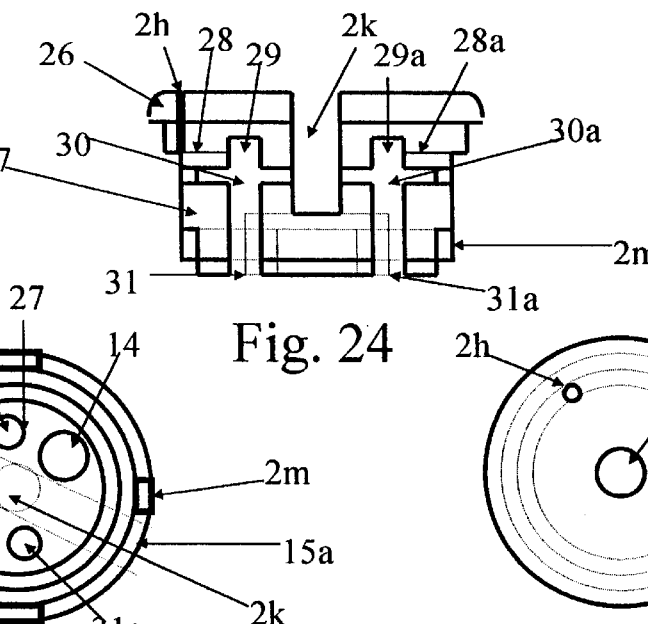
FIG. 24 shows the cross sectional view of a two piece filter head, illustrates other tunnel positions related to a single stage bypass system.

FIG. 24 depicts a cross sectional view of the filter head according to the other features of the invention and transforms the aforementioned one solid piece filter head 2 into two halves, referred to in FIGS. 1, 3, 15, 16, 22 and 23. This configuration of the filter head of the invention comprises of an upper filter body 26 and a lower filter body 27, comprised within is a single stage bypass system and retains all other functions as said one piece filter head 2 thereby showing coordinate positions of said safety valve's central chamber 2k which houses said safety valve 1, said magnet pieces 2m, said drain conduit 2h and the broken lines showing said safety and open tunnels. The tiny orifice ducts 28a and 28b lead into chambers 29 and 29a of the bypass chamber 30 and 30a. The two exit tunnels 31 and 31a are beneath the circular chamber spaces 30 and 30a The chambers 29 and 29a inside the upper filter body 26 are not necessarily in alignment with the two exit tunnels 31 and 31a when threaded together with the lower filter body 27.

Figure 25:
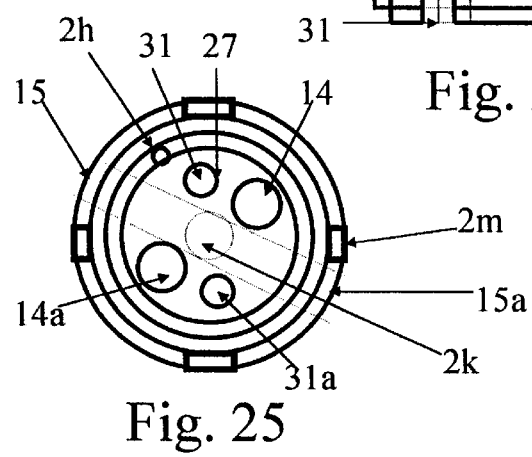
FIG. 25 shows the bottom view of said two piece filter head illustrates coordinating positions of all tunnel-exits and disposition of the magnetic pieces.

FIG. 25 shows more clearly the bottom view of the lower filter body 27 concerning the appropriate positions of all the features within the two piece filter head in FIG. 24. Exits 31 and 31a are the tunnel exits of the bypass system, referred to FIG. 31. Exits 14 and 14a are the safety tunnels illustrated in FIGS. 15, 17 and 23. Horizontal tunnel exits 15 and 15a are the open flow tunnels illustrated in FIGS. 16, 22 and 23. Said drain conduit 2h is located adjacent to the top rim of the upper body member 26 of the filter head, while magnetic pieces 2m are aligned around the circular surface in positions not blocking the exits 15 and 15a nor the orifice ducts 28a and 28b shown in FIG. 24.

Figure 26:
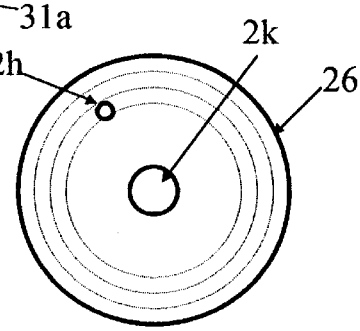
FIG. 26 shows the top view of said two piece filter head illustrates the position of the centre chamber of the safety valve and the drain conduit.

FIG. 26 shows the top view of the upper filter body 26 of said filter head referring to FIGS. 24 and 25. Central chamber 2k is the housing chamber for appropriate sensing instruments, such as safety valve or pressure gauge. Location 2h is the position of the top drain conduit.

Figure 27:
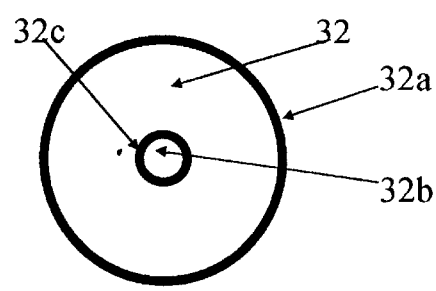
FIG. 27 shows the top view of a second circular steel cloth sheet filtering medium with a centre opening having a outer and inner U-ring sealing gasket.
Figure 31:
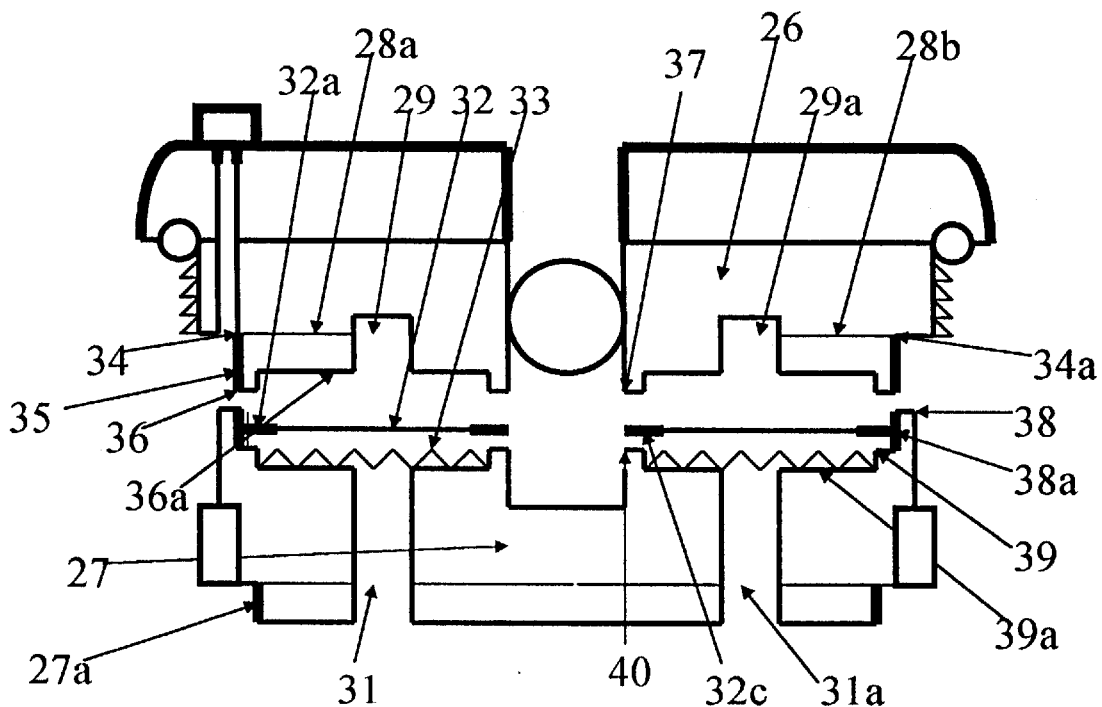
FIG. 31 shows more clearly the cross sectional view of said two piece filter head illustrates the single bypass system with said second medium and said second underlay member, positions of the two orifices, and tunnels.

FIG. 27 illustrates the top view of the second circular steel cloth sheet medium 32 with an opening 32b to which accommodates the safety valve 1 referred to FIGS. 24 and 31 within centre chamber 2k. Said second circular sheet medium 32 having the U-ring sealing gasket 32a on the outer rim and a centre sealing gasket 32c defining the centre opening 32b. Said second sheet medium 32 is made for the filtering system within the filter head which is equipped with a centre cavity chamber 2k described in FIGS. 24 and 35.

Figure 28:
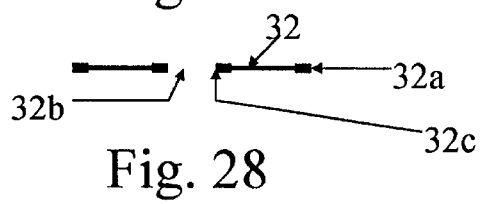
FIG. 28 shows the cross sectional view of said second circular steel cloth sheet medium referred to in FIG. 27.

FIG. 28 depicts more clearly the cross sectional view of the said second circular sheet medium 32, with U-ring 32a, centre U-ring 32c and centre opening 32b.

Figure 29:
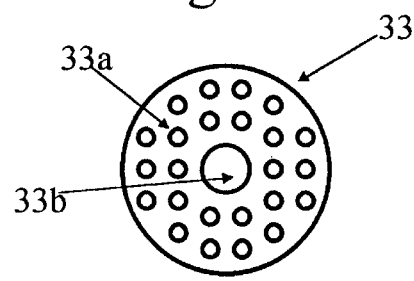
FIG. 29 shows the top view of a second circular, perforated and corrugated underlay member with a centre opening, which is the underlay member of said circular sheet medium referred to in FIG. 27.
Figure 30:
FIG. 30 shows the cross sectional view of said second circular medium underlay member in FIG. 29.

FIG. 29 and FIG. 30 illustrate the top view and cross sectional view of the corrugated and perforated sheet metal second circular underlay member 33 with a centre opening 33b which is aligned coincidentally with said centre opening 32b of said second medium 32 in FIG. 27 and said centre instrument chamber 2k in FIG. 24.

FIG. 31 depicts a cross sectional view according to the aforementioned single stage bypass system within said two piece filter head, referred to in FIG. 24. At the bottom of said upper filter body 26, which has a projected outer rim member 36, threaded on its outer circumferential area 35. Said projected outer rim member 36 encompassing a recess area 36a forming the upper bypass chamber extending radially inwardly surrounding an inner circular projected member 37 which is bordering the safety valve chamber 2k. On the surface of said recess 36a thereon are two symmetrically positioned shallow holes 29 and 29a, referred to FIG. 24 which are the chambers designed to receive small oil streams from the orifice ducts 28a and 28b of which orifices are positioned at point 34 and 34a. As on the top circular surface of the lower filter body 27 the same arrangement is constituted to form the lower bypass chamber, a projected outer rim member 38 having inner circumferential thread 38a, adjacent to but beneath said thread 38a is a raised circular ledge 39 of which encompasses a recess area 39a extending radially and inwardly surrounding an inner circular projected member 40 which is matching said inner circular projected member 37 and also borders said safety valve chamber 2k. On the surface of said recess area 39a, two matching size holes 31 and 31a extend their extremities to the bottom of said lower filter body 27 which are the oil exit tunnels. Said second circular underlay member 33 is placed under said second circular sheet medium 32 against said recess surface 39a of the lower bypass chamber of said lower filter body 27. Said outer U-ring sealing gasket 32a of said second circular medium 32 then rests on said circular ledge 39 so that its small centre U-ring sealing gasket 32c rests on top of said circular projected member 40. During the threading action that brings together the upper filter body 26 and lower filter body 27, said projected outer rim member 36 matches circular ledge 39 and closes intimately so that contact on outer U-ring seal gasket 32a is made, as said inner circular projected member 37 of the upper filter body 26 simultaneously comes in intimate contact on inner U-ring 32c. Such threading action applies equal pressure on said upper and lower contact areas compressing outer U-ring 32a and inner U-ring 32c thus said second circular sheet medium 32 is secured within the single bypass chamber forming a sandwiched filter construction of the invention.

Figure 32:
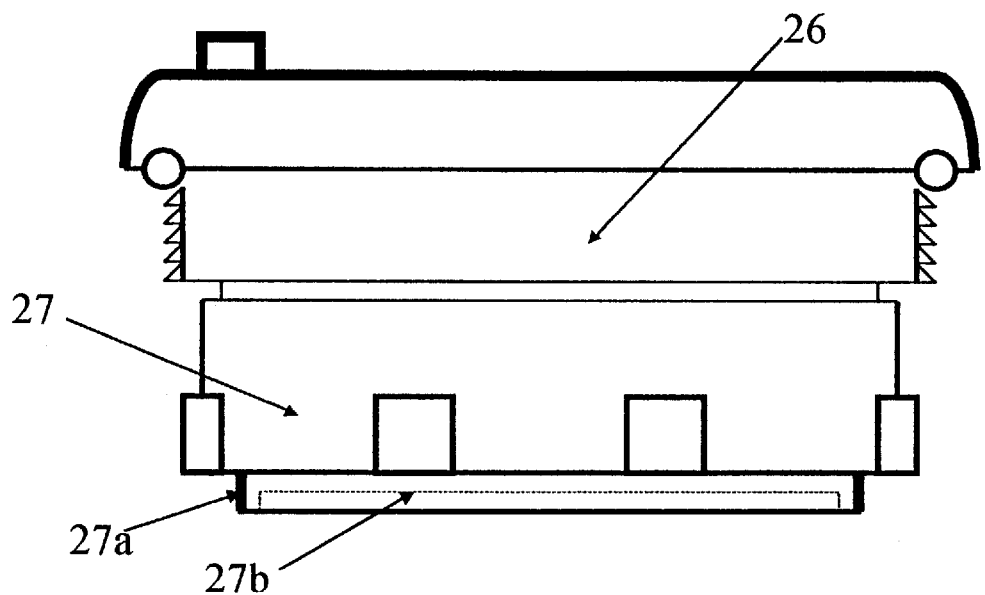
FIG. 32 shows the side view of said two piece filter head enclosed with a single bypass system in FIG. 31.

FIG. 32 shows the full side view of the enclosed said two piece filter head with upper filter body 26 and lower filter body 27 having a bottom rim 27a threaded on its outer circumference, referring to FIG. 31. Said threaded circumference 27a is for receiving said cylindrical medium supporting member 6 referred to FIG. 7 or the adaptable first circular bushing disk 5 which forms said safety full flow filter 5i, referred to FIGS. 18, 22, and 23. The bottom recessed indentation 27b is the upper chamber of said safety full flow filter 5i, referred to FIGS. 18 and 22 which, in the case that such application can be utilized by adapting said first circular bushing disk 5, referred to in FIGS. 6 and 18.

Figure 33:
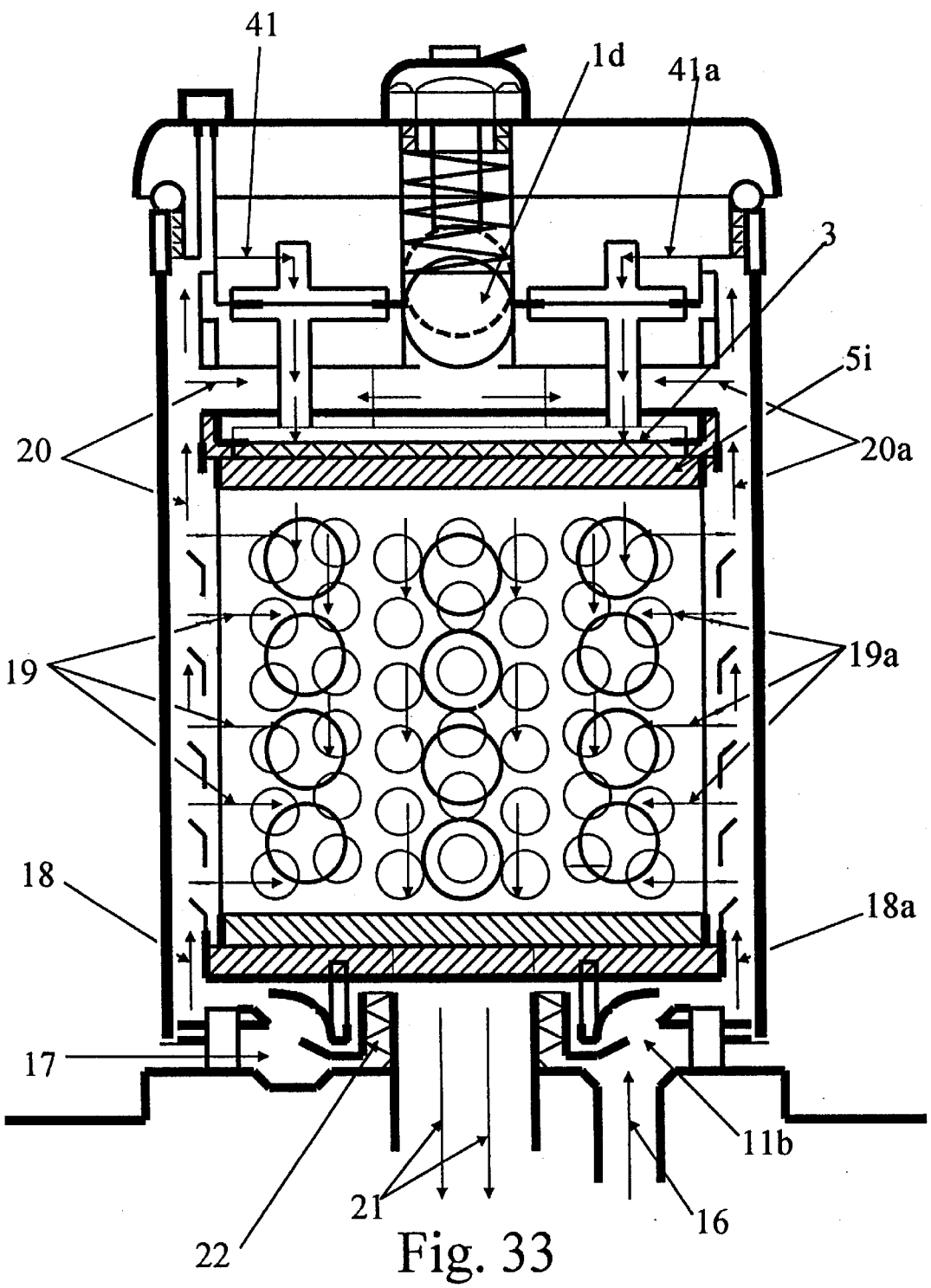
FIG. 33 shows the cross sectional view of a assembled functioning invention with two piece filter head in its normal filtering mode comprised with a single stage bypass system, and a safety full flow filter.

FIG. 33 illustrates an assembled functioning invention having various oil paths that flow within the filter canister. The invention is in the normal filtering mode which is comprised of a single stage bypass system. Said magnetic pieces 2m are in position along with said safety valve 1d and said safety full flow filter 5i, referred to FIGS. 18 and 22. Oil from engine flows on oil path 16 moves around space 17 and then enters inlet ports 11b then flows into said cylindrical canister shown by oil paths 18 and 18a. The main flow of oil moves vibrantly and rapidly on paths 19 and 19a into the perforated holes of flow guide 8, then permeates through said flow guide 8 and is filtered by said cylindrical main full flow medium 7 thereupon passing through said cylindrical medium supporting member 6. Other oil paths 20 and 20a show that oil travels freely in and out the open flow tunnel 15 referred to in FIG. 16. In this normal filtering mode said safety valve 1d is in the closed position. Some oil is forced into the single stage bypass filtering chamber via the orifice ducts shown by oil paths 41 and 41a. Oil being filtered by a finer second circular sheet medium 32 in FIG. 31 passes said first courser safety full flow sheet medium 3 in FIG. 4 within said safety full flow filter 5i referred to in FIGS. 6 and 18. The filtered bypass oil stream merges with the filtered main oil flow stream within the core space of said cylindrical medium support 6 and returns to the engine shown on oil path 21.

Figure 34:
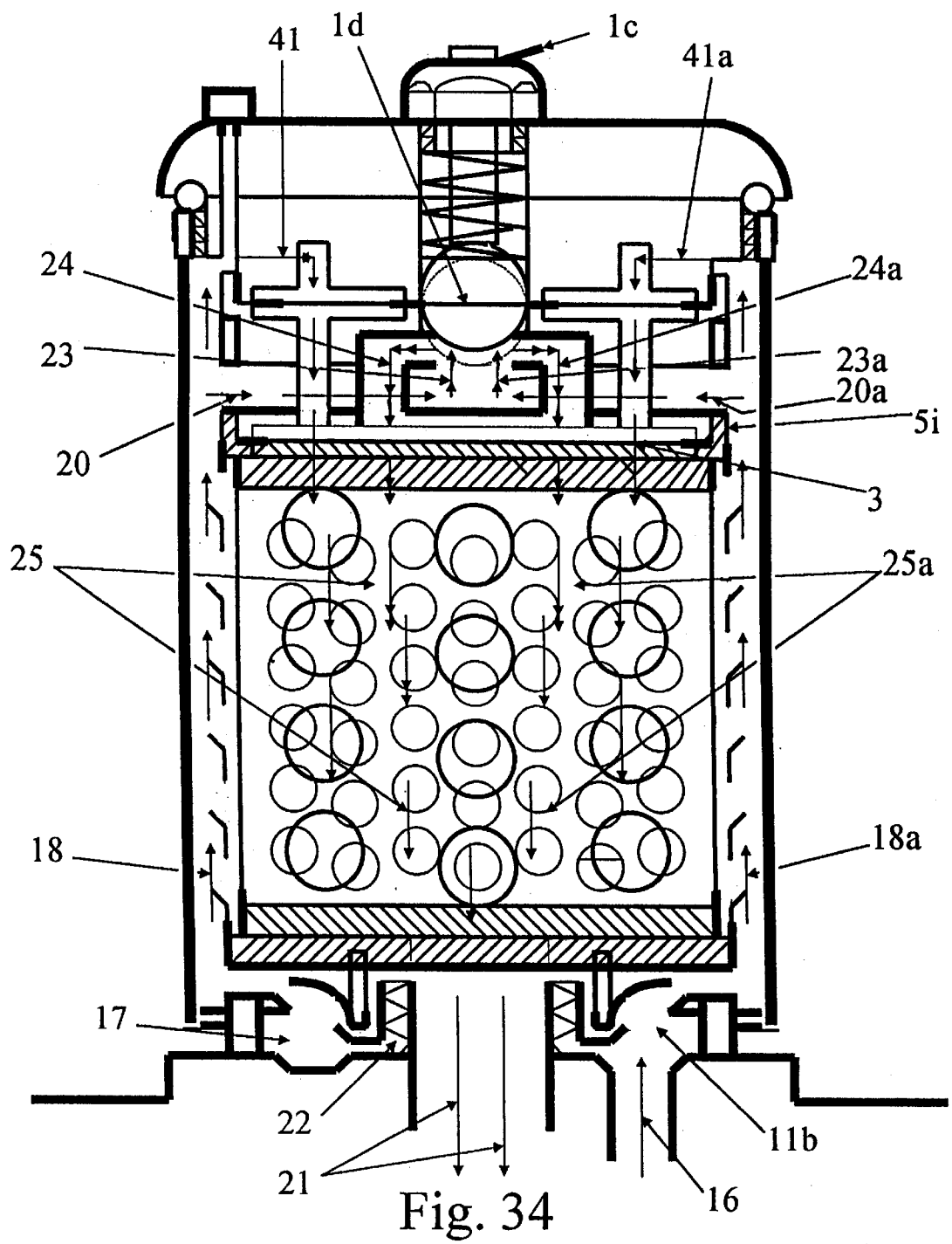
FIG. 34 shows the cross sectional view of the invention comprised with a two piece filter head in its restricted filtering mode comprised with a single stage bypass system and a safety full flow filter.

FIG. 34 shows the cross section view of the invention in accordance to FIG. 33 and illustrates various oil paths running within the invention but it is in the restricted filtering mode. The invention is comprised of said magnetic pieces 2m, said single stage bypass system and said safety full flow filter 5i. Oil from engine flows on oil path 16, going around space 17, entering inlet ports 11b, oil paths 18 and 18a which shows oil circumfusing within said filter canister 11. The oil is moving rapidly in this mode flowing vibrantly forward, passing by said flow guide 8 without disturbing the contaminated cylindrical full flow medium 7 referred to in FIG. 8 and flowing on to paths 20 and 20a. Oil entering the full flow tunnel 15 on paths 23 and 23a shows that oil forces open said safety valve 1d and advancing on path 24 and 24a within the two safety valve tunnels referred to FIG. 15 and 23. The oil continues to flow rapidly toward said safety full flow filter 5h and is filtered by a course first circular sheet filter medium 3 referred to FIGS. 21 and 23. Simultaneously, oil flows through open-flow tunnel 15 and around said magnetic pieces 2m therefrom flowing on paths 41 and 41a shows oil entering the bypass filtering chamber via the orifice ducts 28a and 28b referred to in FIG. 31 and being filtered by the finer second circular sheet medium 32. The small oil stream then flows into the bypass exit tunnels approaching said safety full flow filter 5i thereto, penetrates the said course first circular sheet medium 3 and merges with the filtered main oil flow shown on oil paths 25 and 25a within the core space of said cylindrical medium support member 6. Gathering momentum the oil then flows back into the engine on oil path 21. Because the cylindrical main full flow filtering medium is fouled thereof said safety valve 1d is lifted to contact the sensor pin 1b thereby activating the indicator light via 1c to alert that the safety valve is functioning and the main oil flow is restricted. Said magnetic pieces 2m imbedded in the filter head continue to trap iron and steel particles that flow near the field.

Figure 35:
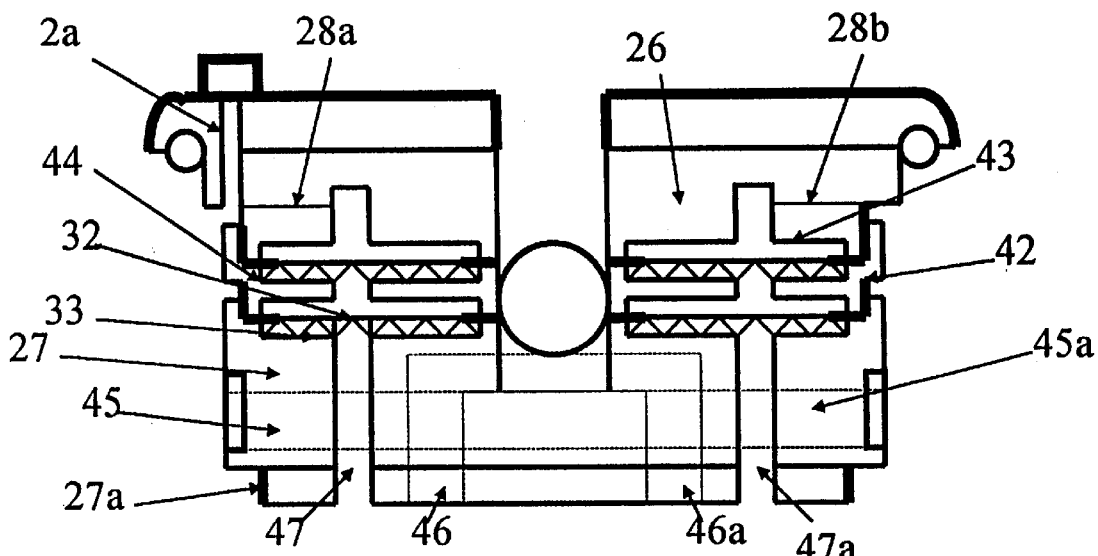
FIG. 35 shows the cross sectional view of the invention of the same two piece filter head referred to in FIG. 34 comprises with a multi-stage bypass system.

FIG. 35 shows the cross sectional view of the invention in relation to FIG. 31 which comprises of a single stage bypass system within the same two piece filter head, therebetween, by inserting the second circular bushing disk 42 which is connected with the top portion of said lower filter body 27 ensuring said (1st) second circular medium underlay 33 and said (1st) second circular sheet medium 32 remains in place on top of said lower filtering member 27. Another second circular medium underlay 44 and another second circular sheet medium 43 are then placed on the top surface of said second circular bushing disk 42. The above assembly when connected with upper filter body 26, said components transform a single stage bypass into a dual stage bypass system of the invention within the same two piece filter head. FIG.

35 which also shows the coordinate positions of the oil orifice ducts 25 and 28a, drain conduit 2h, with broken lines showing open flow exit tunnel 47 and 47a, as well as safety flow tunnel exits 48 and 48a, dual bypass tunnel exits 49 and 49a and threads on the outer surface of the rim 27a. The invention provides versatility and transform ability. For example, by enlarging the oil duct 28a and 28b into full flow oil tunnels and replacing them with appropriate courser circular sheet filtering mediums, enables the system to be easily converted into a single stage or a dual stage full flow system. Referred to in FIG. 50.

Figure 36:
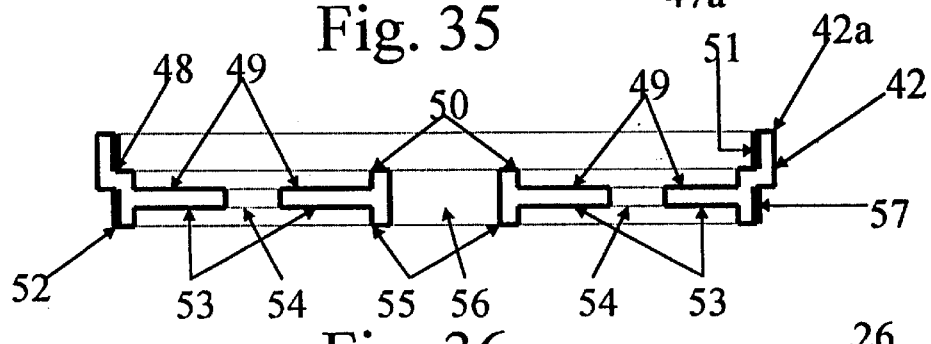
FIG. 36 shows the cross sectional view of the second circular bushing disk for multi-stage bypass system.

FIG. 36 illustrates the cross sectional view of said second circular bushing disk 42, which has a circular projected rim 42a. The adjacent thread 51 is on the inner rim area of said member 42a. A radially extended raised ledge 48 is adjacent and beneath to the said thread 51 and encompasses circular recess surface 49. Said recessed surface 49 has a central axis aperture with a raised circular lip shown as projected member 50. A (2nd) second circular medium underlay member 33 is then placed beneath a (2nd) second circular sheet medium 32 against the recess surface 49 referred to in FIG. 35. When upper filter body 26 is assembled together with said second circular bushing disk 42, the result of the threading action is two circular pressure areas are created on the upper side of said second circular bushing disk 42, which is the circular ledge 48 and centre circular projected member 50. Said (1st) second Outer U-ring sealing gasket 32a rests on ledge 48 and said (1st) second central U-ring gasket 32c rests on the central projected member 50, reference to FIG. 35. Openings 54 are passages for filtered oil. The bottom portion of said second circular bushing disk 42 is made to receive the lower filter body 27. Said second circular bushing disk 42 has on its outer circumference 57, a 90 degree indent, which is threaded to receive said lower filter body 27. Surface 53 which is the bottom recess forming a outer projected rim-member 55 encompassing a radially, inwardly extending recess 53 which becomes the upper chamber of the second stage filter. Said recess 53 having said central axis with circular raised rim shown as projected member 55 bordering safety valve chamber 2k, referred to in FIG. 35. There are two circular pressure areas on this lower part of said circular bushing disk 42, said projected rim 52 for pressing said (2nd) outer U-ring sealing gasket 32a and said centre circular projected member 55 for pressing said (2nd) centre U-ring sealing gasket 32c.

Figure 37:
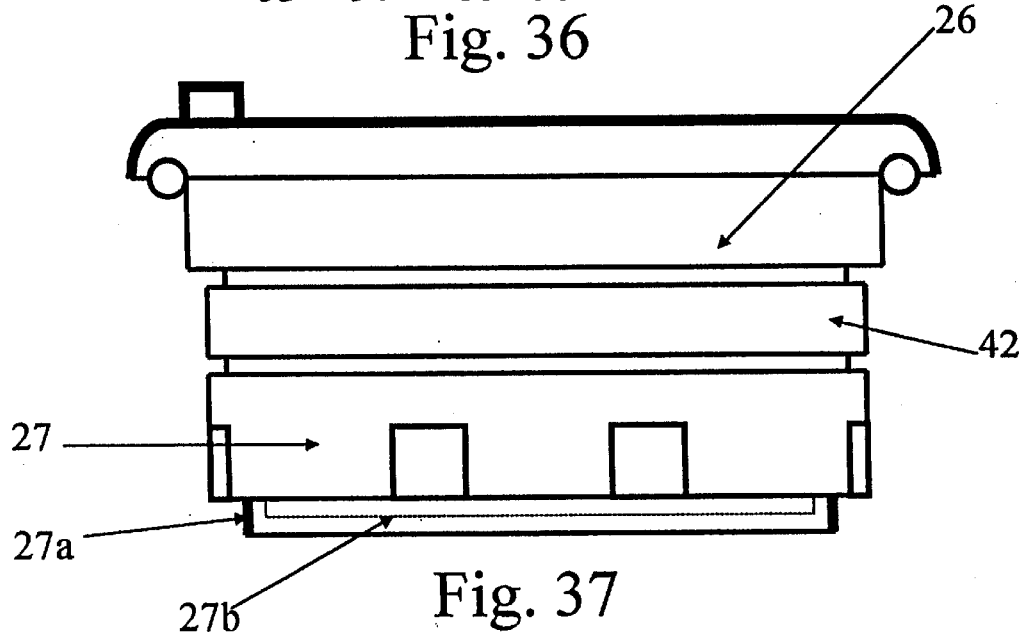
FIG. 37 shows the full side view of the filter head enclosed with a multi-stage bypass system.

FIG. 37 illustrates the full side view of an enclosed filter head in accordance with FIG. 36 consisting of a dual bypass system. This alternate form of the invention is complete when said upper filter body 26 and said lower filter body 27 are sandwiched together with the adaptable said second circular bushing disk 42 referred to in FIG. 36. The bottom portion of said lower filter body 27 having a threaded outer circular surface 27a forms a projected rim which forms a recess. The recess 27b becomes the upper chamber of said safety full flow filter 5i when adapted to said first circular bushing disk 5, referring to FIG. 18.

Figure 38:
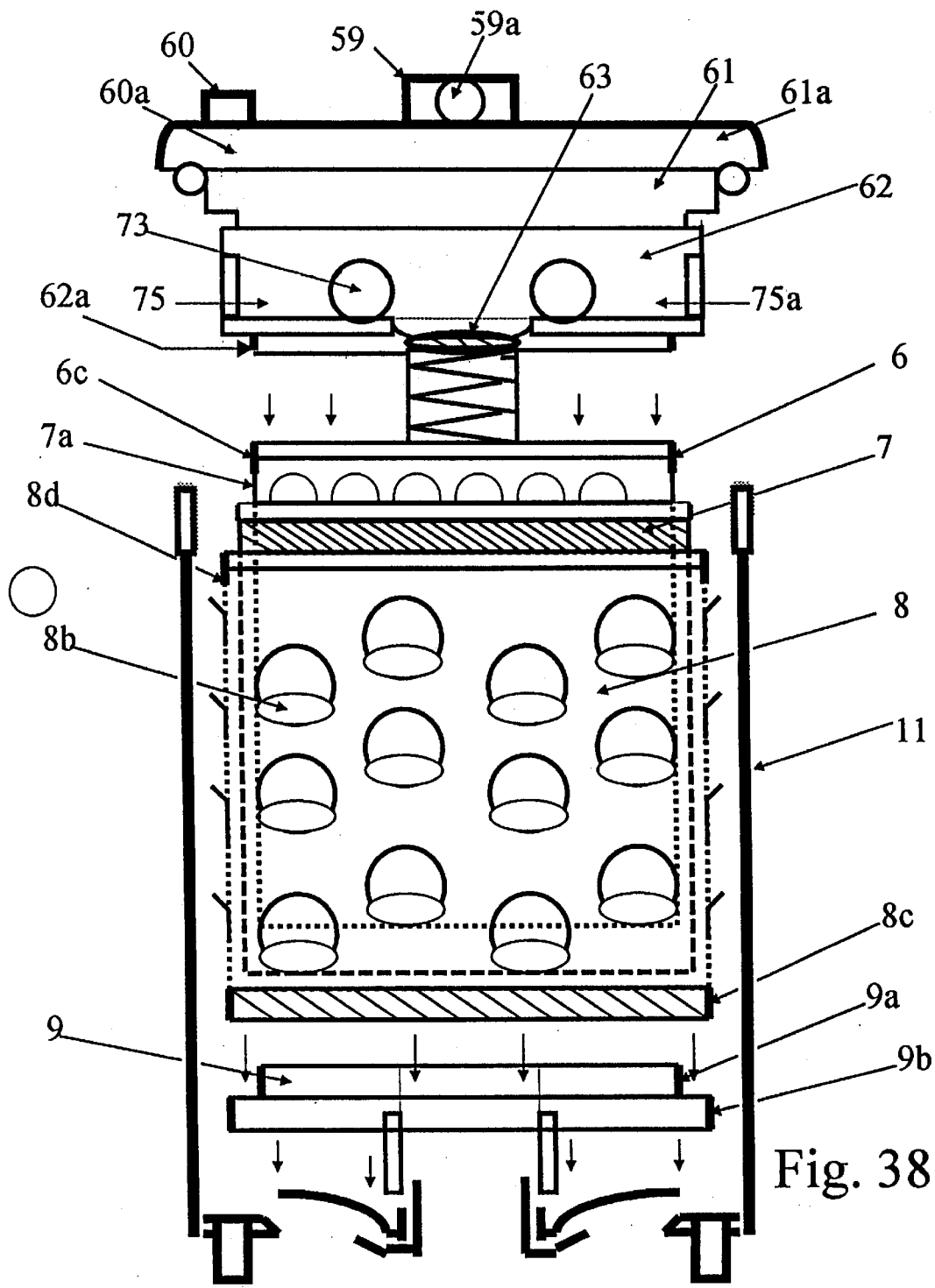
FIG. 38 shows the cross sectional view of a transformed two piece filter head comprised with an alternate type of safety valve and the components to be installed in sequence.

FIG. 38 shows another transformation and alternate configuration of the invention having a two piece filter head and closely resembles the aforementioned configurations in FIG. 32 and 33. The centre nut 59 on the top of the upper filter body 61 has a four-way hole 59a interconnected for easy removal from the filter canister by inserting a metal rod and turning to loosen the nut. A screw-driver or other instrument may be used in a similar way to loosen the nut. Adjacent to the edge of the cap 61a is a drain nut 60. When said drain nut 60 is screwed to drain conduit 60a it closes the drain, referred to FIG. 22. Lower filter body 62 of said filter head has magnetic pieces 73 imbedded in the surrounding surface. The alternate safety valve 63 has been installed at the bottom centre which is centrally connected to the open flow tunnel 75. This alternate design provides a flatter filter head for situations whereby installation space is limited. FIG. 38 also exhibits more clearly the sequence of assembling the invention made up of cylindrical medium support 6, cylindrical full flow medium 7, cylindrical flow guide 8, retaining base member 9 and the open end filter canister 11. In particularly FIG. 38 illustrates a clearer view of the relationship set between said cylindrical medium support 6, said cylindrical full flow medium 7 and said cylindrical flow guide 8 thereon shows said protruding lips 8b of said perforated holes 8a, referred to in FIG. 9.

FIG. 39 depicts the cross sectional view of the invention according to FIG. 38 and exhibits more clearly the alternate configuration of said shorter two piece filter head of the invention also related to FIG. 31 and 38. Said two piece filter head consisting of an upper filter body 61 and a lower filter body 62 contains a single stage bypass system. Said filter head equipped without said cylindrical safety valve chamber 2a is referred to in FIG. 24 and 31. In this alternate configuration, an alternate safety valve 63 is implemented and is located at a different position. Therefore, the circular sheet medium 69 resembles sheet medium 3 in FIG. 21 and the circular medium underlay member 70 requires no centre opening as shown in FIG. 40 and FIG. 41. The drain nut 60 is threaded in place shutting the drain conduit 60a. The O-ring 64 is fitted into a groove and is positioned adjacent to and above the threaded circular surface 65. The other outer threaded circular surface 66 of the upper filter body 61 is designed to receive the inner threaded rim 71 of the lower filter body 62. The circular ledge 71a is made so the outer U-ring seal gasket 69a of medium 69 can rest on it. During the threading action, pressure is applied equally on circular projection 66a and said circular ledge 71a creating intimate contact on the filtering medium perimeter seal 69a. The filtering medium being secured by the above action beneath said circular underlay member 70 and are both sandwiched between the upper body 61 and lower body 62. Orifices 67 and 67a lead to chambers 68 and 68a of the upper filter head. Two openings 72 and 72a having both extremities through the bottom of lower body 62 are the two bypass tunnels. Magnetic pieces 73 are installed on the circular surface of lower part 62. The thread 62a on the outer surface of the bottom rim of lower part 62 is for connecting said cylindrical full flow element 7 in FIG. 38 or with said safety full flow filter 5i in FIG. 18.

FIG. 40 depicts the top view of the circular sheet medium 69 which can be used as the medium for the single stage and the dual stage bypass systems for the filter head which is without the centre safety valve chamber 2k shown in FIG. 39. Said circular sheet medium 69 is the same as said circular medium 3 referred in FIG. 4 and can also be used as the filtering medium for said safety full flow medium 3 in FIG. 21 provided appropriate courser porosity is used. The circular U-ring seal gasket 69a is same as the 3a shown in FIG. 21.

FIG. 41 exhibits the top view of the circular medium underlay member 70 of said circular sheet medium 69 which also can be used in the single stage and the dual stage bypass system as well as can be used in said safety full flow filter 5i referred to in FIG. 5.

FIG. 42 shows the full side view of said two piece filter head with upper filter body 61 and lower filter body 62 forming the single stage bypass system of the invention having magnetic pieces 73 on the circumferential surface of lower filter body 62 and a broken line which shows the appropriate positions of the open flow tunnel exits 75 and 75a.

Figure 43:
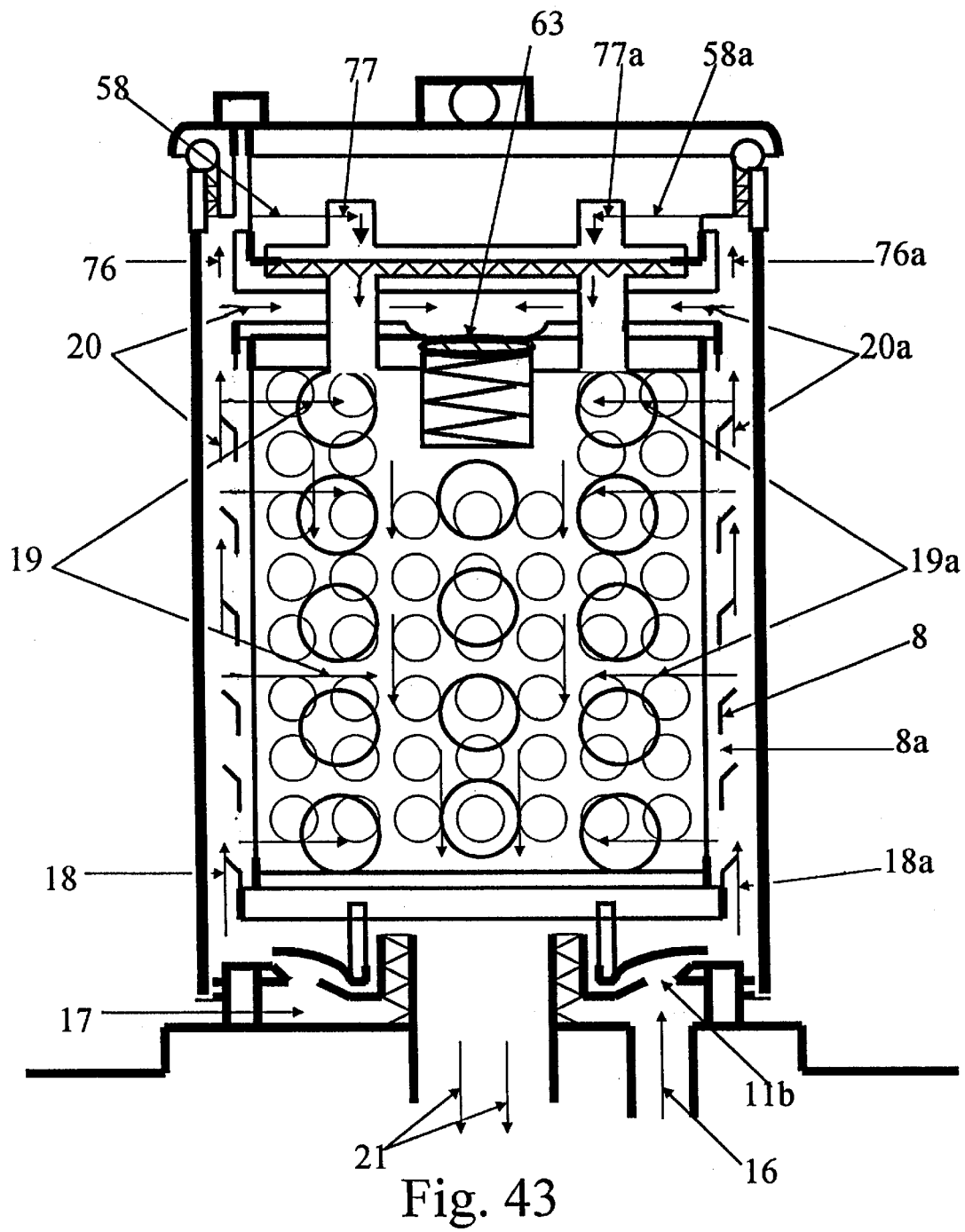
FIG. 43 shows the cross sectional view of the invention is in the normal full flow and single stage bypass filtering mode in a transformed, alternate construction, equipped with an alternate safety valve, a shorter two piece filter head and without the safety full flow filter.

FIG. 43 shows the assembled functioning alternate construction of the invention in the normal filtering mode. The invention also contains said alternate safety valve 63 and a single stage bypass system within said filter head. Oil flows out from the engine on oil path 16 circumfuses in space 17, enters inlet ports 11b, flows rapidly on path 18 and 18a. The oil then flows on paths 19 and 19a into the main full flow element from around said flow guide 8 via all perforated holes 8a. Some oil flows freely on paths 20 and 20a in and out of the open flow tunnels 75 and 75a. At this stage said safety valve 63 remain in a closed mode. Small amounts of oil travels further on path 76 and 76a and are forced into orifices 58 and 58a shown on path 77 and 77a. The oil permeates through the bypass medium down to the bypass tunnels and into the core space within the cylindrical full flow medium. There this oil merges with the main filtered oil flow gathering momentum while flowing back into the engine on path 21.

Figure 44:
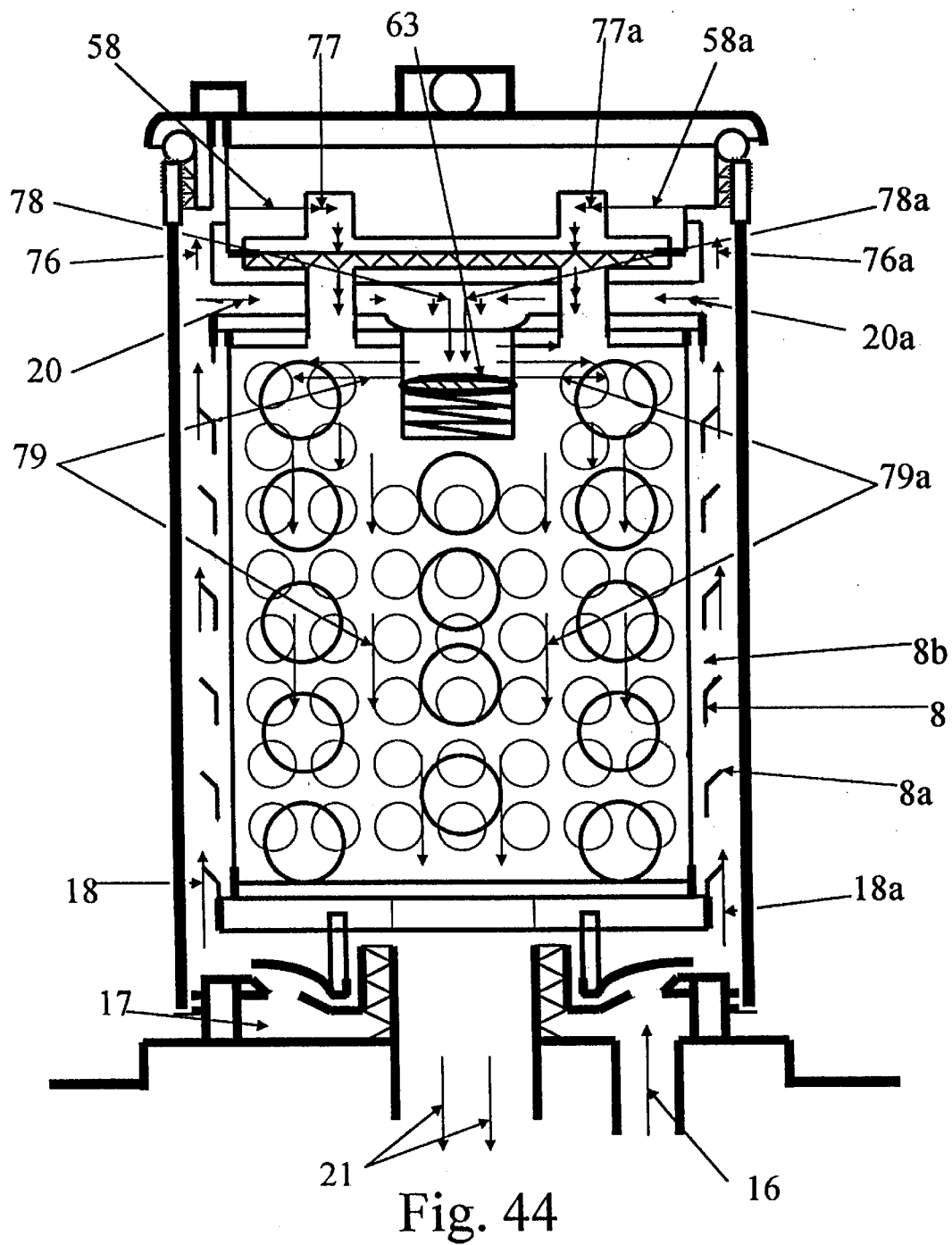
FIG. 44 shows the cross sectional view of said shorter two-piece filter head of the invention is in the restricted full flow and the single stage bypass filtering mode in an alternate construction, equipped with an alternate safety valve, and without the safety full flow filter

FIG. 44 exhibits the assembled functioning invention in the restricted filtering mode, the invention comprises of a single stage bypass system within said filter head. Oil flowing out of the engine on oil path 16 goes around space 17 entering inlet ports and moving rapidly forward on paths 18 and 18a, passing through said flow guide 8 without disturbing the fouled medium which lies behind the baffled oil flow. Oil paths 20 and 20a shows the oil flowing towards the open flow tunnel on path 78 and 78a thereby pushing open the safety valve 63 which allows the main flow of oil to disburse into the core space of the cylindrical medium support member. Some of the oil travelling on flow paths 76 and 76a is forced into orifices 58 and 58a shown on paths 70 and 70a entering the upper bypass chamber thereupon permeating through the bypass medium down the bypass tunnels into the core space within the cylindrical element support. The oil flow proceeds and merges with the main unfiltered oil flow gathering momentum and returning to the engine on path 21. At this stage the said bypass filter may be clogged by particles and may not function in a desirable capacity.

Figure 45:
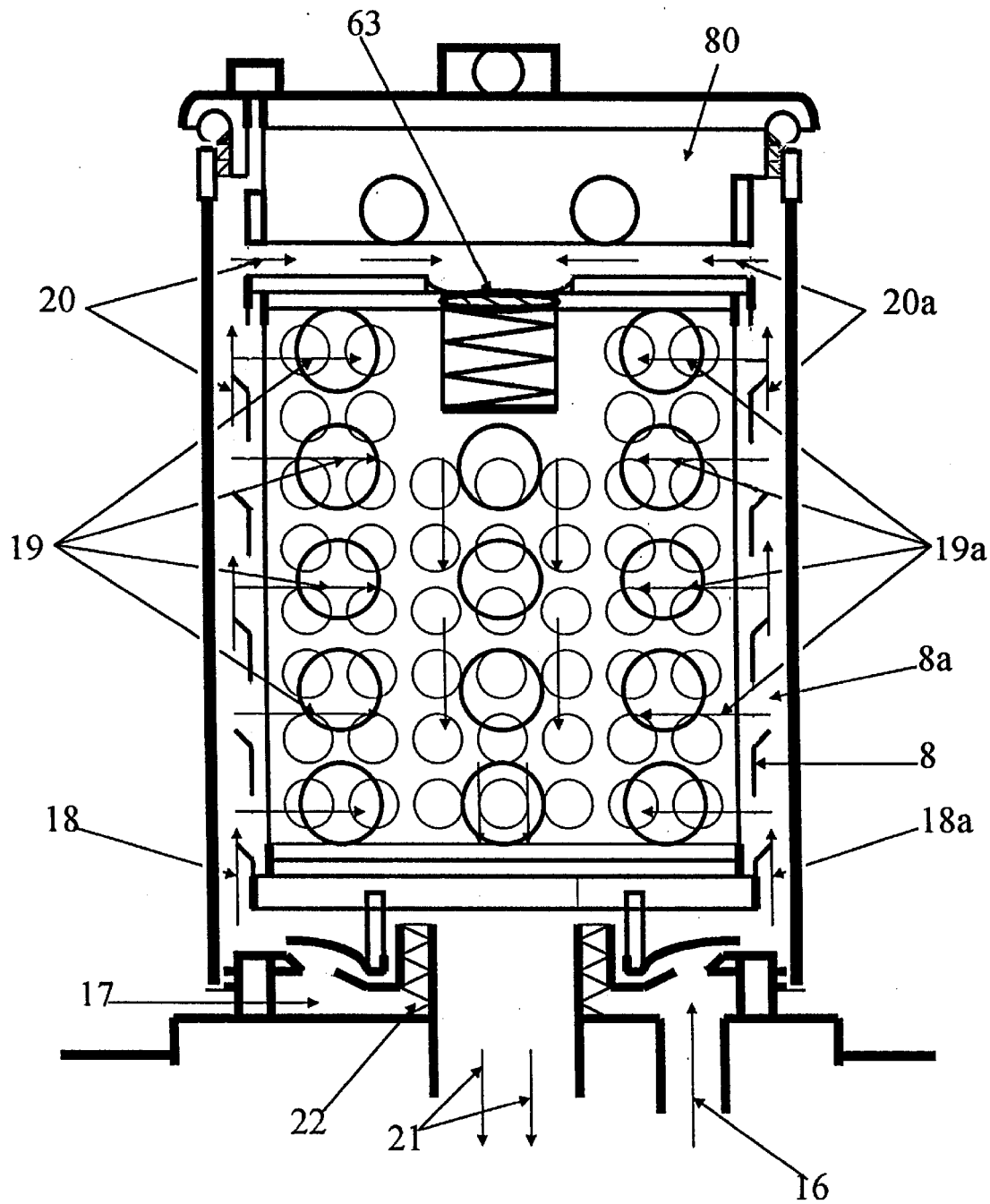
FIG. 45 shows the cross sectional view of the shorter one-piece filter head of the invention functioning in its normal full flow mode without the bypass system and without the safety fill flow filter.

FIG. 45 is a schematic version of the invention which shows the filter head 80 with no bypass system and no safety full flow filter. This schematic shows the plain alternate assembly of the invention in a normal filtering mode. Oil from the engine block flowing on path 16 spreads around the concave recess space 17 and is forced through inlet ports. The oil flow then forcibly opens the circular flap into the filter canister. Oil flows rapidly upward on paths 18 and 18a entering the flow guide 8. The oil flowing on paths 19 and 19a shows oil penetrating the main full flow element. The filtered main oil flow picks up momentum and returns to the engine on path 21. Oil paths 20 and 20a shows oil travelling freely within the open flow tunnel flowing around the imbedded magnetic pieces 73, all the while said safety valve 63 remains in the closed position.

Figure 46:
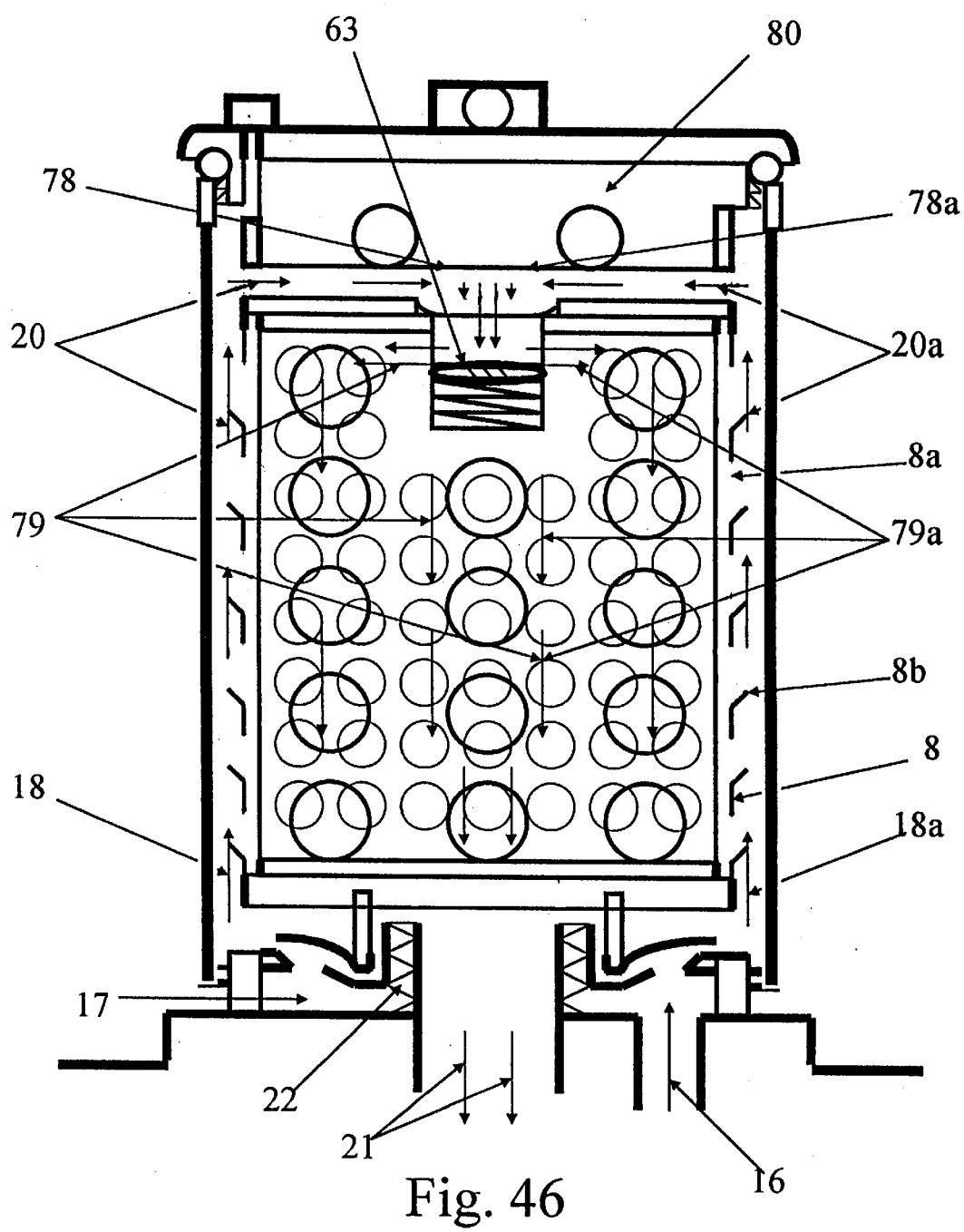
FIG. 46 shows the cross sectional view of the shorter one-piece filter head of the invention function in its restricted full flow mode without the bypass system and without the safety full flow filter.

FIG. 46 is a same assembly to FIG. 45 depicting said filter head 80. Said filter head comprises of no bypass system nor does it have a safety full flow filter. This alternate assembly of the invention is in a restricted filtering mode. Oil forced out from the engine flows on oil path 16 flowing around space 17, entering the inlet ports and forcing open the circular flap. The oil flowing into the filter casing moves rapidly forward on paths 18 and 1 8a, passing by the flow guide 8 without disturbing the fouled cylindrical full flow medium 7 behind it because of the baffled ports and the protective body of the flow guide 8. Oil paths 20 and 20a shows the oil flowing in the open flow tunnel and proceeding on oil flow paths 78 and 78a, said oil flow pushes open said safety valve 63 and allows the main flow of oil from the oil body to disburse into the core space of the cylindrical full flow medium as show on oil path 79 and 79a. The oil flow in growing filtered volume flows back to the engine on path 21.

Figure 47:
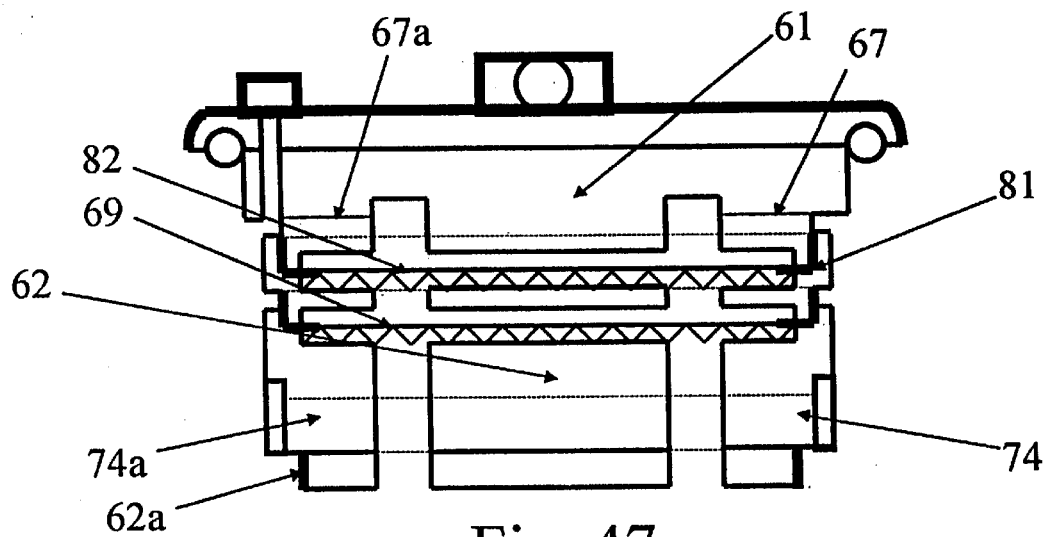
FIG. 47 shows the cross sectional view of an alternate configuration of the invention, the same two-piece shorter filter head shown in FIG. 44 can be easily converted into a dual stage bypass system by incorporating a first circular bushing disk between the said two piece shorter filter head.

FIG. 47 depicts another alternate configuration of the invention which comprises a dual bypass system. As referring to FIG. 39 the same filter head of said upper filter body 61 and said lower filter body 62 which has a single bypass system is used to show additional filtering capacity thereby a dual bypass system can be demonstrated by separating said upper and lower filter body of said filter head and ensuring said first circular sheet medium 69 and said first circular medium underlay 70 remain in position on top of lower filter body 62. The dual bypass system is then created by simply adding said first circular bushing disk 5 in FIG. 6 thereby which is housed with a second circular sheet filtering medium 82 and a second circular medium underlay member 83. The above assembly when threaded together with the lower filter body 62 forms the lower part of the first stage of the dual by-pass filter assembly. The second stage of the dual by-pass filter assembly is made by adding upper filter body 61 in a stacked configuration. When said upper filter body 61 is stacked and threaded in place above said first circular bushing disk 5 which contains said second circular filtering medium 82 and said second circular medium underlay member 83, a multi sandwiched filtering assembly is formed, which is the dual bypass system of the invention. Broken line shows the position of the open flow channel exits 74 and 74a, and 62a is the threaded outer circumference to receive the cylindrical medium supporting member 6.

FIG. 48 depicts a cross sectional view of the circular bushing disk member 81 which is the same first circular bushing disk 5 that was shown in FIG. 6 and FIG. 47. The inner threaded rim surface 81a is adjacent to a raised circular ledge 81d whereon rests the U-ring 81 and medium 82. Said ledge 81d, encompasses upper recessed circular surface 81c which contains perforations 81b that provide openings for the passage of filtered oil. Said recessed circular surface 81c when attached to a upper filter head body becomes a lower filtering chamber. The lower outer threaded rim surface 81e is designed to connect with the lower filter body referred to in FIG. 47. The projected circular member 81f forms a circular rim to hold down the U-ring of a second filtering medium when used in a dual bypass system. The bottom recessed surface 81g when attached to a lower filter body becomes the upper filter chamber referred to in FIG. 47. Said circular bushing disk member 81 also can be used as said safety full flow filter 5i referred to in FIGS. 6 and 18.

Figure 49:
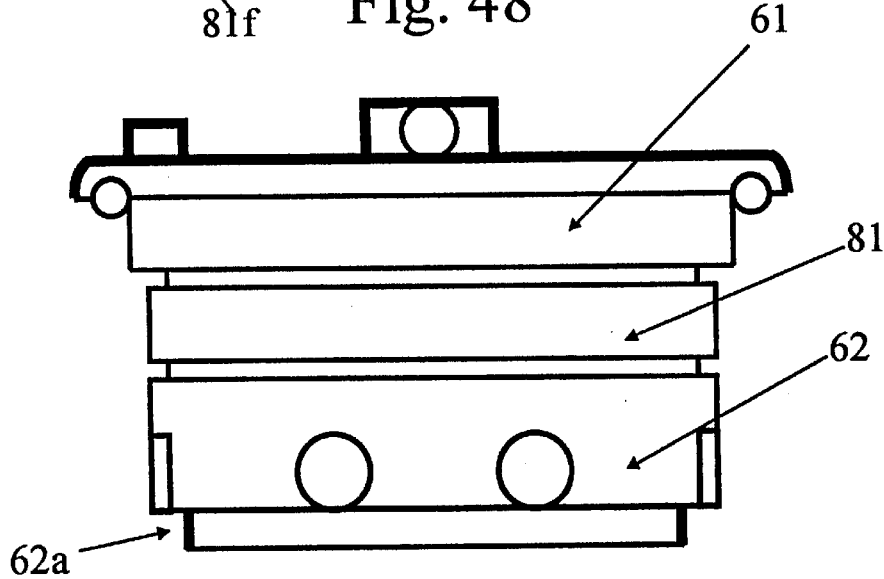
FIG. 49 shows the side view of the two piece shorter filter head of the invention enclosed with said dual stage bypass system.

FIG. 49 is the full side view of the alternate filter head with upper filter body 61 and lower filter body 62 enclosed with a dual bypass system facilitated by said adaptable circular bushing disk member 81. The outward threaded rim surface 62a is for adapting a safety full flow filter 5i or with the cylindrical full flow medium 7.

Figure 50:
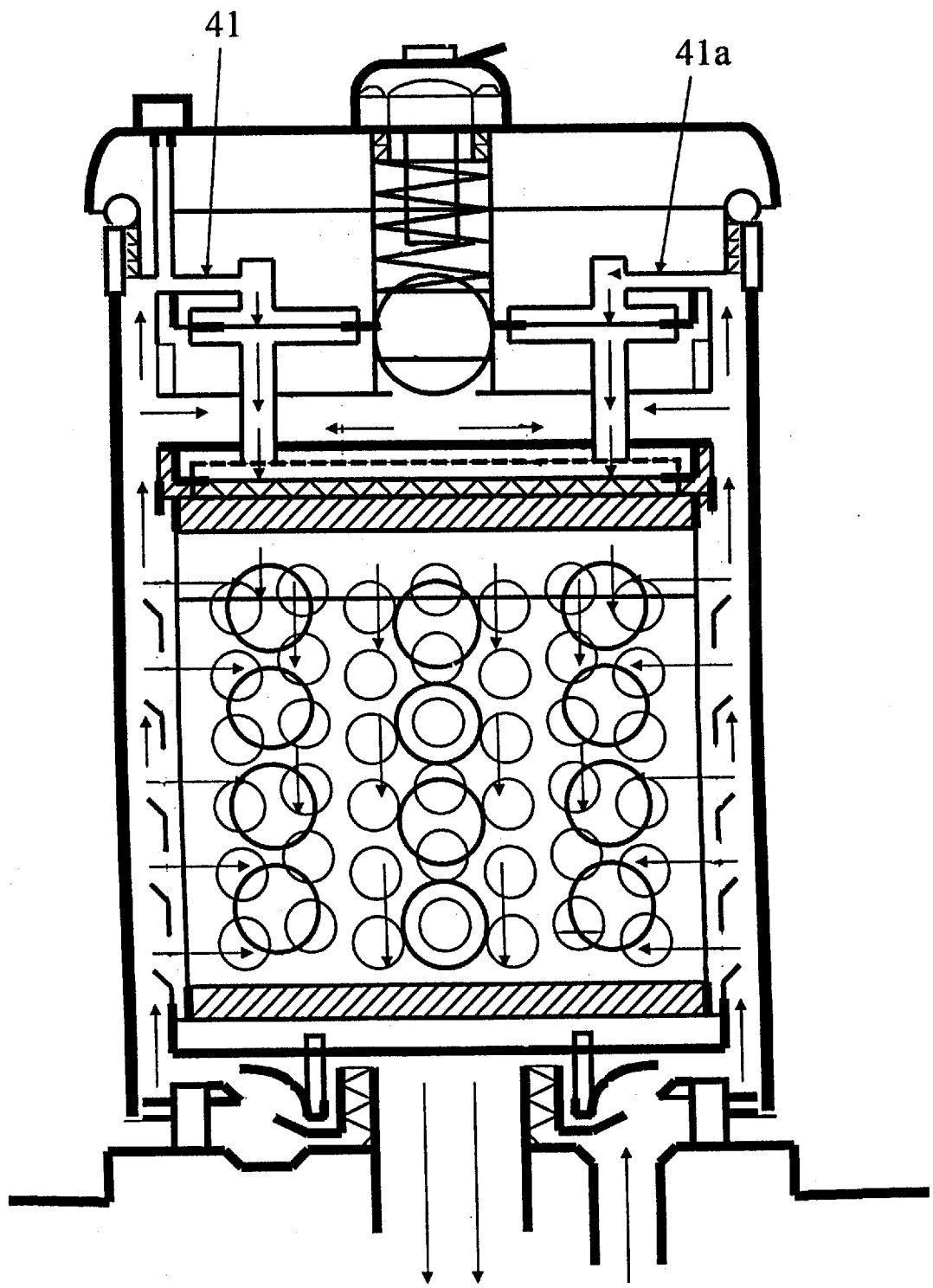
FIG. 50 shows the cross sectional view of the invention having the orifice ducts 41 and 41a enlarged and is easily transformed from a bypass system to an additional full flow filter system of the invention.

FIG. 50 shows the upper filter body referring to the same upper filter body in FIG. 33 said tiny orifice ducts are enlarged and the finer circular medium can be replaced with courser circular sheet medium. Such structure means of the invention allows modification for all bypass systems.

Figure 51:
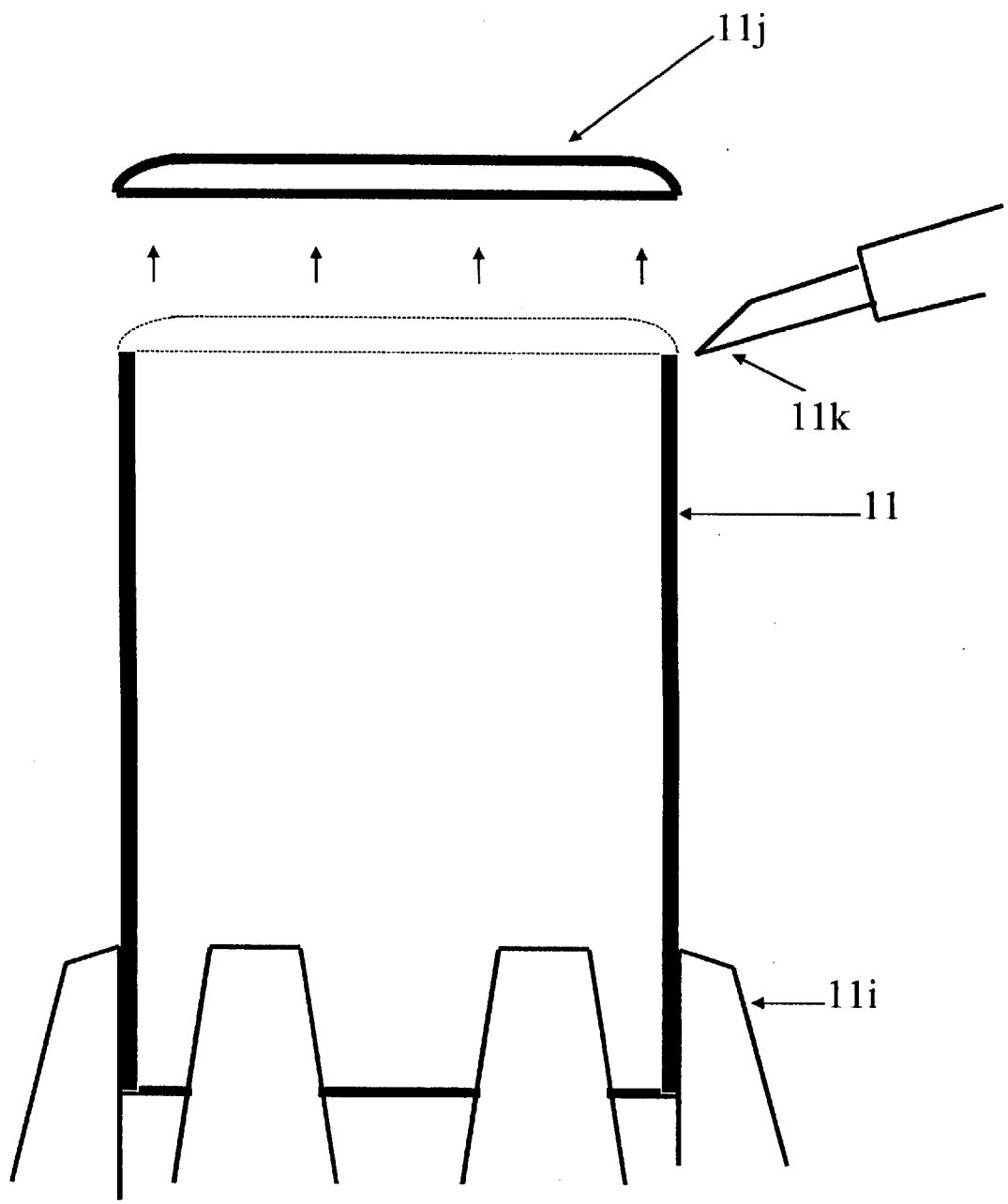
FIG. 51 shows the cross sectional view of a conventional filter canister is placed within a lathe ready to be machined off the top.

FIG. 51 depicts the important parts of the invention. Part of the invention when utilizing conventional or existing filter canister that are on the market and adapting them to receive the internal filtering mediums of the invention creates a reusable filtering canister. When a typical oil filter is removed from a internal combustion engine in the conventional way, the filter is then placed on a metal lathe adapted to receive the used filter canister 11. By rotating said filter canister 11 and pressing against its side with a fixed cutting tool 11k, the top of the typical filter body 11j is cut off at a predetermined point. The contaminated internal paper filtering material and other materials are removed from the filter canister 11. Said filter canister 11 is then cleaned in a solvent solution.

Figure 52:
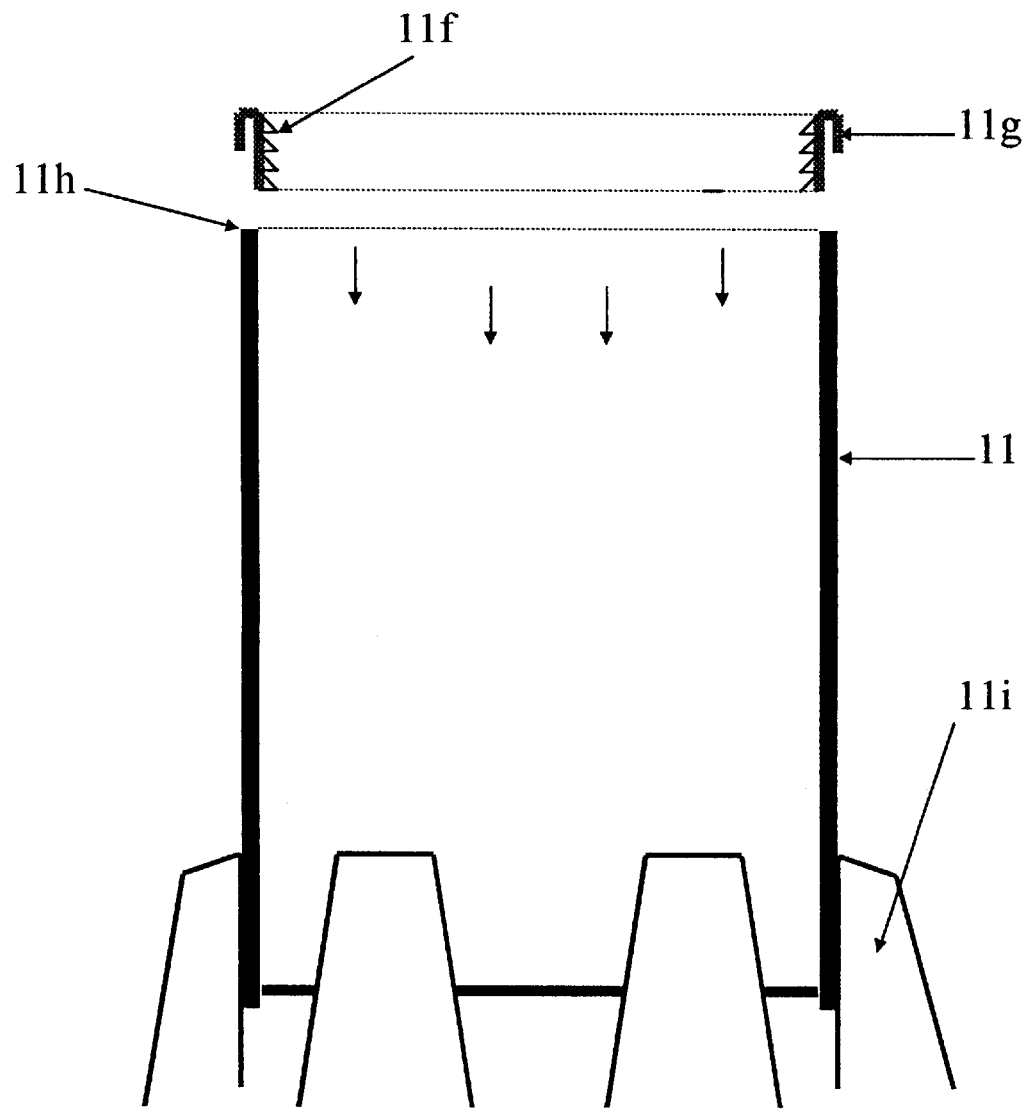
FIG. 52 shows the cross sectional view of said conventional canister which is ready to receive said metal U-ring and to be mounted on top and around the rim.

FIG. 52 depicts the cleaned-open-ended filter canister 11. This reclaimed filter canister 11 is now ready to receive a metal O-ring 11g which is shaped in a "U" fashion. Said U-ring is fitted to the cleaned filter canister in various conventional fastening means such as, welded or crimped. When said U-ring 11g is mounted inversely and secured radially on the top of the rim, the internal radial surface 11f is then threaded by an appropriate instrument. Said U-ring fits tightly against the rubber O-ring sealing gasket 2g of said filter head when fastened together and is designed to secure an internal filtering apparatus. The refitted filtering canister is now ready to receive the core of the invention, the filtering devices and mechanism which can be used and reused over and over again. The core part of the invention when assembled in the refurbished canister creates a complete multi system filter which is reusable for the entire life of the internal combustion engine that it services.

Figure 53:
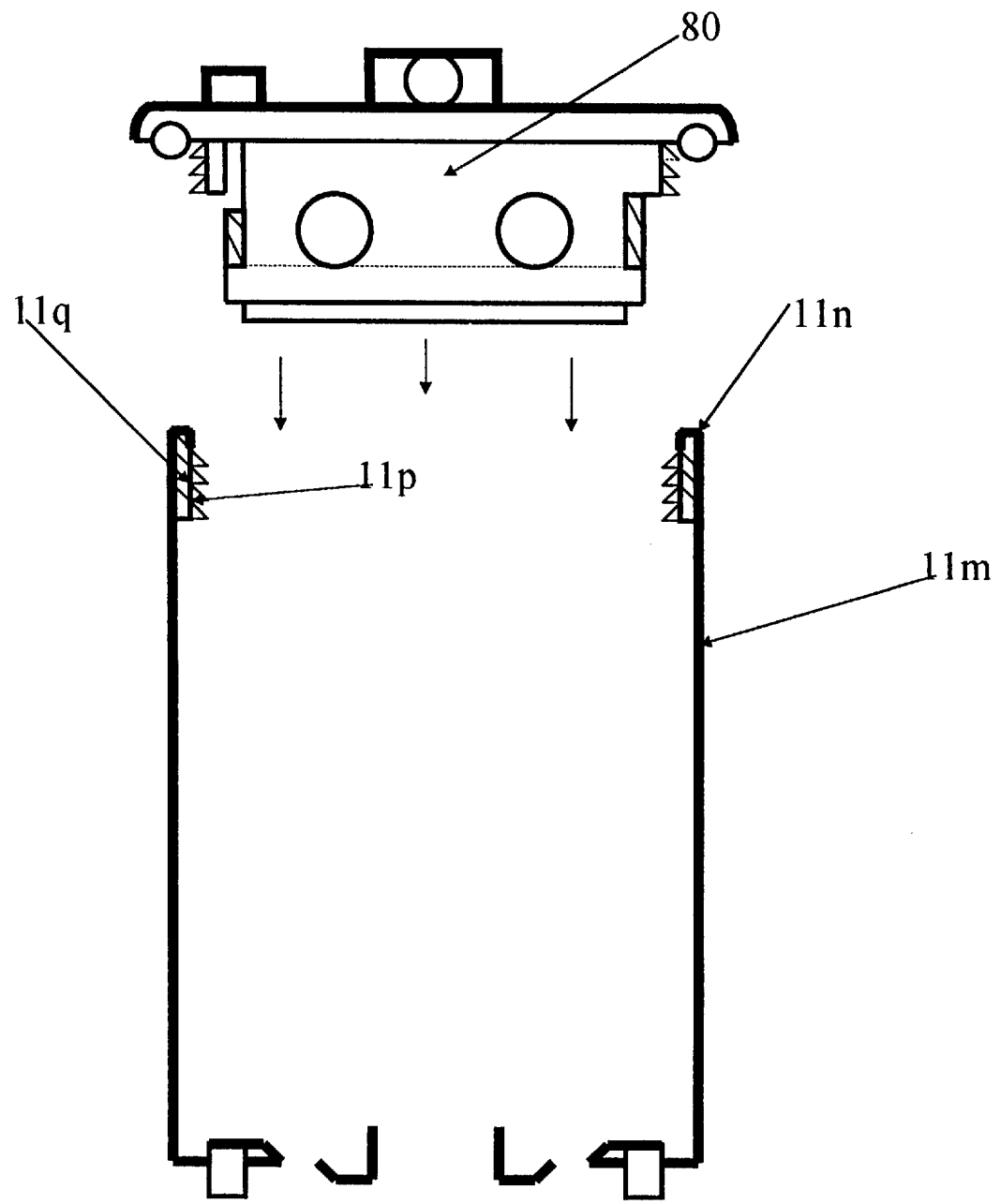
FIG. 53 illustrates the relationship of attachment between the new filter canister and the one piece filter head of the invention.

FIG. 53 shows the configuration of a new filter canister 11m comprises of an open-end 11n and a metal O-ring 11q which has an inner thread 11p, said O-ring 11q is placed within said canister 11m therein before said open-end 11n is curled inwardly forming a radially extending groove thereby said metal ring 11q is fitted in said groove and is secured by crimping means. The one piece filter head 80 related to FIG. 45 showing the relationship of attachment between said filter head 80 and said canister 11m.

Obviously, modifications of the present invention are possible in light of the above information. In the scope of the appended claims, the invention may be practiced other than as specifically described. It is also understood the fastening and sealing examples described are for illustration purposes and other means can be utilized

What I claim is:

1. A reusable oil filter, comprising:

a hollow container having opposed ends;

a plurality of spaced apart concentric filtration members removably mounted in concentric relation within said container, each member having a different porosity for providing a plurality of successive filtering steps;

removable filter head means releasably mounted to one end of said container for sealing said one end of said opposed ends, said filter head including upper and lower filter body members, an underlay sheet element and at least two oil flow holes; and filter base means removably mounted to said container, said filter base means having an inlet to receive oil to be filtered and an outlet to discharge filter oil.

2. The filter according to claim 1, wherein each of said plurality of filtration members is releasably connected to an adjacent filtration member.

3. The filter according to claim 2, wherein connection between said plurality of filtration members comprises a tight fitting connection.

4. A filter according to claim 1, wherein said filter head further comprises a radially overhanging flange configured to form a cover for said filtration members, a circumferential groove at a bottom side of said flange adapted to contain a sealing gasket, and magnetic pieces imbedded on a circumferential surface of said filter head for removing metallic material from oil flowing through said filter.

5. The filter according to claim 1, wherein said upper and lower filter body members are circular and wherein said underlay sheet element is circular, each of said upper and said lower circular filter body members containing a circular indentation on each opposite interior surface to thereby form an outer circular projected rim and a central circular projected rim adapted to accommodate said circular underlay sheet element and on said indented surface of said upper filter body member there are provided two or more small cavities positioned to connect with two or more orifices leading in from the circumferential surface and on said indented surface of said lower filter body member there are provided two flow exit holes.

6. The filter according to claim 1, wherein a cylindrical perforated body with a protruding lip on each perforation for deflecting oil flow and functioning as a flow guide is connected to said filter base means.

7. The filter according to claim 2, wherein said filter includes a central core positioned centrally of said filter container, said plurality of concentric filtration members in stacked releasable interconnection surrounded and coaxially disposed with said central core.

8. The filter according to claim 1, wherein said removable filter head includes safety valve means for selectively passing oil therethrough when oil pressure exceeds a predetermined value.

9. The filter according to claim 8, wherein said valve means includes indicator means for indicating said valve means is actuated.

10. The filter according to claim 1, wherein said filtration members are composed of steel mesh.

11. An oil filter for filtering oil, said filter including a hollow container with a closed end and an opposed end having an inlet and an outlet, comprising:

a removable filter head, said filter head including upper and lower filter body members, an underlay sheet element and at least two oil flow holes;

flow guide means for directing oil flow about the internal periphery of said container;

first filtration media disposed concentrically and in spaced apart relation with said flow guide means for filtering said oil; and main filtration media disposed concentrically within said first filtration media for further filtering said filtered oil from said first filtration media, said main filtration media being in communication with said outlet of said container.

12. The filter as set forth in claim 11, wherein said first filtration media comprises steel mesh.

\* \* \* \* \*